(12) United States Patent
Fitchmun

(10) Patent No.: US 7,869,588 B2
(45) Date of Patent: Jan. 11, 2011

(54) SYSTEM AND METHOD FOR PROVIDING PARTICULARIZED AUDIBLE ALERTS

(75) Inventor: Mark I. Fitchmun, San Diego, CA (US)

(73) Assignee: Somatek, San Diego, CA (US)

( * ) Notice: Subject to any disclaimer, the term of this patent is extended or adjusted under 35 U.S.C. 154(b) by 1461 days.

(21) Appl. No.: 11/119,229

(22) Filed: Apr. 28, 2005

(65) Prior Publication Data

US 2005/0243996 A1 Nov. 3, 2005

Related U.S. Application Data

(60) Provisional application No. 60/568,083, filed on May 3, 2004.

(51) Int. Cl.
*H04M 3/02* (2006.01)

(52) U.S. Cl. .................. 379/418; 340/7.6; 340/692; 379/106.09; 382/135; 455/17; 455/404.1

(58) Field of Classification Search ............... 379/67.1, 379/82, 88.21, 142.17, 373.01, 373.02, 418, 379/106.09; 455/415, 17, 404.1; 340/7.6, 340/692; 382/135
See application file for complete search history.

(56) References Cited

U.S. PATENT DOCUMENTS

| | | | | |
|---|---|---|---|---|
| 4,682,367 A | * | 7/1987 | Childress et al. | ............... 455/17 |
| 4,720,848 A | | 1/1988 | Akiyama | |
| 5,559,860 A | | 9/1996 | Mizikovsky | |
| 5,740,532 A | * | 4/1998 | Fernandez et al. | ....... 455/404.1 |
| 6,122,347 A | | 9/2000 | Borland | |
| 6,160,489 A | * | 12/2000 | Perry et al. | ................... 340/7.6 |
| 6,178,167 B1 | | 1/2001 | Fraser | |
| 6,373,925 B1 | * | 4/2002 | Guercio et al. | ................. 379/82 |
| 6,385,303 B1 | | 5/2002 | Peterson et al. | |
| 6,501,967 B1 | | 12/2002 | Mäkelä et al. | |
| 6,573,825 B1 | | 6/2003 | Okano | |
| 6,618,474 B1 | * | 9/2003 | Reese | ..................... 379/142.17 |
| 6,636,602 B1 | | 10/2003 | Vlacancich | |
| 6,714,637 B1 | | 3/2004 | Kredo | |
| 6,807,259 B1 | | 10/2004 | Patel et al. | |

(Continued)

FOREIGN PATENT DOCUMENTS

WO WO 99/49681 9/1999

(Continued)

*Primary Examiner*—Gerald Gauthier
(74) *Attorney, Agent, or Firm*—Knobbe Martens Olson & Bear

(57) ABSTRACT

A system and method of generating at least two distinctive auditory alerts upon receiving a transmission or telephone call at a device is described. Data indicative of a first plurality of sounds corresponding to a user of a device configured to receive the transmission or telephone call is accessed, such as from a memory. The first plurality of sounds is played at the device so as to identify a received transmission or telephone call being directed to the user. A telephone number, subscriber name or identifier associated with a transmitting or calling party of the transmission or telephone call is accessed. Data indicative of a second plurality of sounds designating the transmitting or calling party based on the subscriber name, telephone number or identifier is retrieved, such as from a data structure, and the second plurality of sounds is played at the device so as to identify the transmitting or calling party.

164 Claims, 18 Drawing Sheets

U.S. PATENT DOCUMENTS

| | | | |
|---|---|---|---|
| 7,206,572 B2 * | 4/2007 | Luneau | 455/415 |
| 7,295,656 B2 * | 11/2007 | Ruckart | 379/88.21 |
| 7,315,618 B1 * | 1/2008 | Moton et al. | 379/373.01 |
| 7,366,337 B2 * | 4/2008 | Kortum et al. | 382/135 |
| 7,418,096 B2 * | 8/2008 | Moton et al. | 379/373.01 |
| 7,443,967 B1 * | 10/2008 | Silver | 379/106.09 |
| 2002/0196914 A1 * | 12/2002 | Ruckart | 379/88.21 |
| 2003/0013432 A1 | 1/2003 | Fukaya | |
| 2003/0016813 A1 | 1/2003 | Weiner | |
| 2003/0161454 A1 | 8/2003 | Nassimi | |
| 2004/0037403 A1 | 2/2004 | Koch | |
| 2007/0147601 A1 * | 6/2007 | Tischer | 379/373.02 |
| 2009/0024183 A1 | 1/2009 | Fitchmun | |

FOREIGN PATENT DOCUMENTS

WO    WO2007/019307    2/2007

* cited by examiner

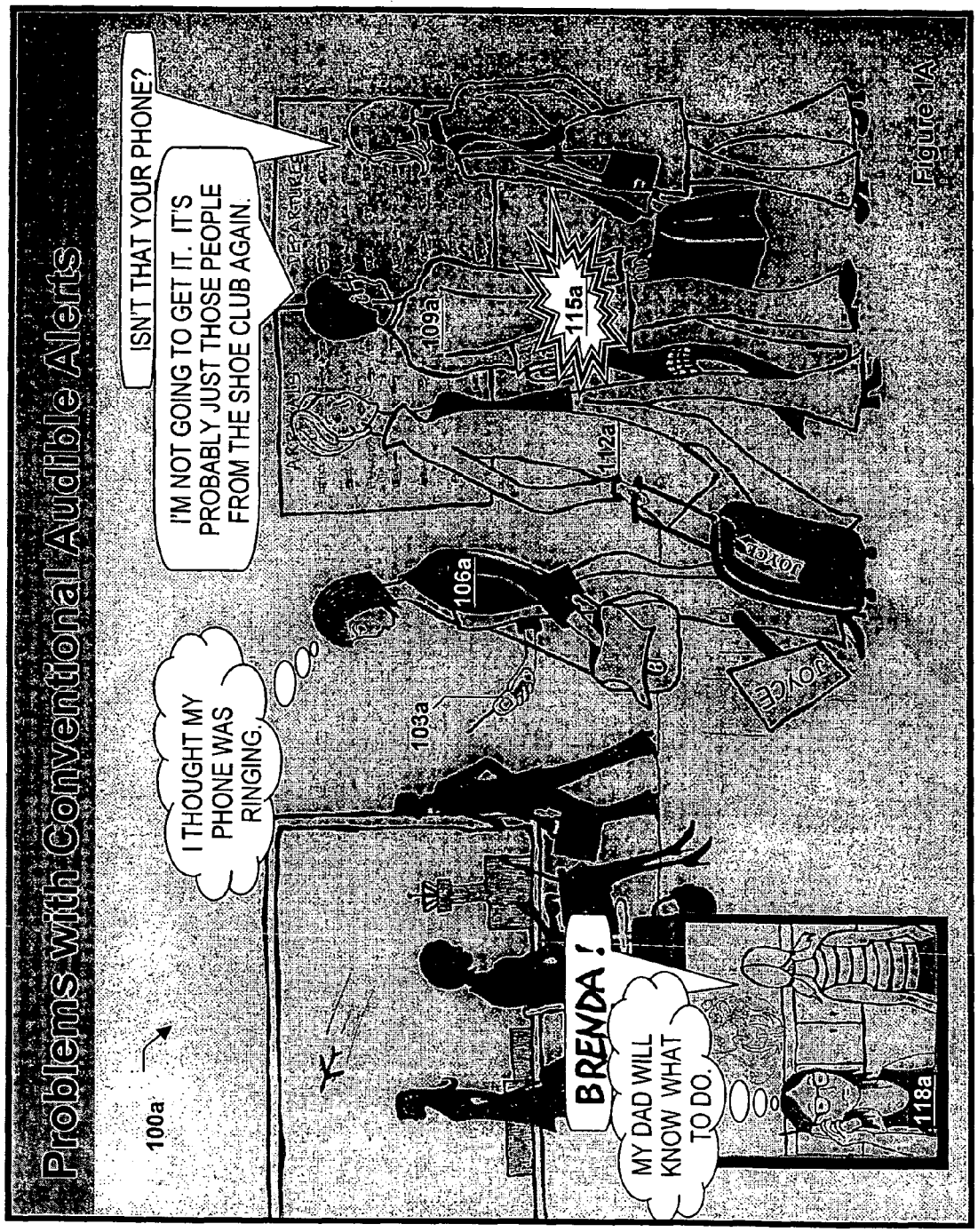

Examples of Preference Options

210 →

INFORMATION CONVEYED IN THE AUDIBLE ALERT? (SELECT ALL THAT APPLY)  /303

| ☑ RECEIVER | ☑ INITIATOR | ☐ CONTACT TYPE | ☑ COMMUNICATION TYPE |

DERIVE ALERTS FROM: (SELECT ONE)  /306

| ☐ NAME (PHONIC) | ☐ NAME (SPELLING) | ☑ PHONE NUMBER |
| ☐ EMAIL ADDRESS | ☐ CUSTOM | ☐ CONTACT CATEGORY |

IF NAME CODE IS SELECTED, HOW DO YOU WANT THE INFORMATION ORDERED?  /309

|  | FIRST | SECOND | THIRD | IF NEEDED | NEVER |
| --- | --- | --- | --- | --- | --- |
| FIRST NAME | ☐ | ☐ | ☐ | ☐ | ☐ |
| MIDDLE I. | ☐ | ☐ | ☐ | ☐ | ☐ |
| LAST NAME | ☐ | ☐ | ☐ | ☐ | ☐ |

IF NUMBER CODE IS SELECTED, WHAT DO YOU WANT PRESENTED?  /312

| ☑ AREA CODE | ☑ PREFIX | ☑ SUFFIX |

IF NUMBER CODE IS SELECTED, HOW DO YOU WANT IT ORDERED? (SELECT ONE)  /315

| ☑ ORIGINAL DIGIT ORDER (NO ENCRYPTION) | ☐ ARBITRARY DIGIT ORDER (ENCRYPTION) | ☐ CUSTOM DIGIT ORDER |

PRODUCE ALERT USING:  /318

| ☑ PHONE RING SOUNDS | ☐ SINE WAVE | ☐ PIANO |
| ☐ VIOLA | ☐ BIRD SOUNDS | ☐ SYNTHETIC VOICE |
| ☐ ARBITRARY SOUNDS | ☐ OPTIMIZED SOUND SET | ☐ CUSTOM |
| ☐ SILLY SOUNDS | ☐ SYNTHETIC SPEECH | ☐ PIG-LATIN SPEECH |

ACOUSTIC SYMBOL CORRESPONDENCE (SELECT ONE)  /321

| ☑ SCRAMBLE (ENCRYPTION) | ☐ OPTIMIZED FREQUENCIES (NO ENCRYPTION) | ☐ CUSTOM |

CADENCE: (SELECT ONE)  /324

| ☑ ‖‖-‖‖—‖‖-‖‖— | ☐ ‖‖—‖‖—‖‖—‖‖— | ☐ ‖‖-‖‖-‖‖-‖‖- |
| ☐ ‖‖-‖‖—‖‖-‖‖— | ☐ ‖‖—‖‖—‖‖—‖‖— | ☐ ‖‖-‖‖-‖‖-‖‖- |
| ☐ ‖‖‖‖—‖‖‖‖—‖‖‖‖— | ☐ ‖‖‖‖‖‖‖‖‖‖‖‖‖‖ | ☐ ‖‖‖‖‖‖‖‖‖‖‖‖‖‖ |

Figure 3

Examples for Arranging Alerts

Example of Acoustic Symbols Assigned to a Character Set

| CHARACTER | INTERVALS COMPRISING ACOUSTIC SYMBOLS | | | EXAMPLES OF FUNDAMENTALS (Hz) | | | | ALTERNATE EXAMPLES OF FUNDAMENTALS (Hz) | | | |
|---|---|---|---|---|---|---|---|---|---|---|---|
| | FIRST | SECOND | THIRD | FIRST | SECOND | THIRD | FOURTH | FIRST | SECOND | THIRD | FOURTH |
| 1 | 2.52 | | | 200 | 504 | | | 290 | 731 | | |
| 2 | 2.11 | | | 200 | 423 | | | 290 | 613 | | |
| 3 | 1.78 | | | 200 | 356 | | | 290 | 516 | | |
| 4 | 1.50 | | | 200 | 299 | | | 290 | 434 | | |
| 5 | 1.26 | | | 200 | 252 | | | 290 | 365 | | |
| 6 | UNITY | | | 200 | | | | 290 | | | |
| 7 | 1.19 | | | 168 | 200 | | | 244 | 290 | | |
| 8 | 1.34 | | | 150 | 200 | | | 217 | 290 | | |
| 9 | 1.59 | | | 126 | 200 | | | 183 | 290 | | |
| 0 | 1.89 | | | 106 | 200 | | | 153 | 290 | | |
| A | 2.37 | 1.06 | | 100 | 237 | 252 | | 145 | 344 | 365 | |
| B | 2.24 | 1.12 | | 100 | 224 | 252 | | 145 | 325 | 365 | |
| C | 2.11 | 1.19 | | 100 | 211 | 252 | | 145 | 307 | 365 | |
| D | 2.00 | 1.26 | | 100 | 200 | 252 | | 145 | 290 | 365 | |
| A | 1.78 | 1.42 | | 100 | 178 | 252 | | 145 | 258 | 365 | |
| F | 1.58 | 1.59 | | 100 | 158 | 252 | | 145 | 230 | 365 | |
| G | 1.41 | 1.78 | | 100 | 141 | 252 | | 145 | 205 | 365 | |
| H | 1.26 | 2.00 | | 100 | 126 | 252 | | 145 | 183 | 365 | |
| I | 1.12 | 2.24 | | 100 | 112 | 252 | | 145 | 163 | 365 | |
| J | 1.19 | | | 252 | 299 | | | 365 | 434 | | |
| K | 1.19 | 1.26 | | 252 | 299 | 377 | | 365 | 434 | 547 | |
| L | 1.19 | 1.26 | 1.19 | 252 | 299 | 377 | 449 | 365 | 434 | 547 | 651 |
| M | 1.50 | 1.19 | 1.19 | 252 | 377 | 449 | 533 | 365 | 547 | 651 | 773 |
| N | 1.78 | 1.19 | 1.26 | 252 | 449 | 533 | 672 | 365 | 651 | 773 | 974 |
| O | 2.12 | 1.26 | | 252 | 533 | 672 | | 365 | 773 | 974 | |
| P | 2.67 | | | 252 | 672 | | | 365 | 974 | | |
| Q | UNITY | | | 672 | | | | 974 | | | |
| A | 2.00 | | | 237 | 475 | | | 344 | 688 | | |
| R | 1.89 | | | 266 | 504 | | | 386 | 731 | | |
| T | 1.78 | | | 299 | 533 | 711 | | 434 | 773 | 1032 | |
| U | 1.68 | | | 336 | 565 | 711 | | 487 | 819 | 1032 | |
| V | 1.59 | | | 377 | 598 | 711 | | 547 | 868 | 1032 | |
| W | 1.50 | | | 423 | 634 | 711 | | 613 | 919 | 1032 | |
| X | 1.41 | | | 475 | 672 | 711 | | 688 | 974 | 1032 | |
| Y | 1.34 | | | 533 | 711 | | | 773 | 1032 | | |
| Z | 1.26 | | | 598 | 711 | 754 | | 868 | 1032 | 1094 | |

FIGURE 6B

Deriving an Acoustic Symbol Set from a Name or Word

List of English Phonemes

| Phoneme Symbols | | | Description | Example |
|---|---|---|---|---|
| m-w.com | SAMPA | cmudict | | |
| p | p | P | Bilabial, Unvoiced Plosive | gap |
| t | t | T | Alveolar, Unvoiced Plosive | cat |
| k | k | K | Velar, Unvoiced Plosive | cat |
| b | b | B | Bilabial Voiced Plosive | bad |
| d | d | D | Alveolar Voiced Plosive | bad |
| g | g | G | Velar Voiced Plosive | gap |
| m | m | M | Bilabial Nasal | mat |
| n | n | N | Alveolar Nasal | nat |
| [ng] | N | NG | Velar Nasal | thing |
| f | f | F | Voiceless labiodental (weak) Fricative | fat |
| th | T | TH | Voiceless dental (weak) Fricative | thing |
| s | s | S | Voiceless alveolar (strong) Fricative | this |
| sh | S | SH | Voiceless palato-alveolar (strong) Fricative | she |
| h | h | HH | Voiceless Aspirate | hit |
| v | v | V | Voiced labiodental (weak) Fricative | love |
| [th] | D | DH | Voiced dental (weak) Fricative | this |
| z | z | Z | Voiced alveolar (strong) Fricative | cheese |
| zh | Z | ZH | Palato-alveolar Voiced (strong) Fricative | measure |
| l | l | L | Lateral voiced (liquid) Approximant | love |
| r | r\ | R | Retroflex voiced (liquid) Approximant | red |
| y | j | Y | Palatal voiced Approximant (glide) | yes |
| w | w | W | Bilabial voiced Approximant (glide) | which |
| ch | tS | CH | Alveolar / Palato-alveolar voiceless Affricate | which |
| j | dZ | JH | Alveolar / Palato-alveolar voiced Affricate | joy |
| E | i | IY | High Front Vowel | beet |
| i | I | IH | Mid High Front Vowel | bit |
| e | A | EH | Mid Front Vowel | bet |
| a | { | AE | Mid-Low Front Vowel | bat |
| ü | u | UW | High Back Vowel | boot |
| u | U | UH | High Back Vowel | book |
| & | | AH | Mid Central Vowel | but |
| ä | Q | AA | Low Back Vowel | cod |
| o | O | AO | ? | bought |
| A | | EY | Diphthong - Mid Front to High Front Vowel | bate |
| I | | AY | Diphthong - Low Central to High Front Vowel | byte |
| oi | | OY | Diphthong - Mid Back to Mid Front Vowel | joy |
| au | | AW | Diphthong - Low Central to Mid Back Vowel | cow |
| O | | OW | Diphthong - Mid Back to High Back Vowel | boat |
| &r | 3 | ER | Retroflex | hurt |

Figure 8

Example of Acoustic Symbols Assigned to Phonemes

← 900

| Phoneme | Duration | Frequency Assignment |
|---|---|---|
| P | 70 ms | { 4, 18 } |
| T | 70 ms | { 4, 13 } |
| K | 70 ms | { 4, 8 } |
| B | 70 ms | { 0, 18 } |
| D | 70 ms | { 0, 13 } |
| G | 70 ms | { 0, 8 } |
| M | 100 ms | { -3, 18 } |
| N | 100 ms | { -3, 13 } |
| NG | 100 ms | { -3, 8 } |
| F | 100 ms | { -10, 18 } |
| TH | 100 ms | { -10, 13 } |
| S | 100 ms | { -10, 8 } |
| SH | 100 ms | { -13, 18 } |
| HH | 100 ms | { -13, 13 } |
| V | 100 ms | { -13, 8 } |
| DH | 100 ms | { -17, 18 } |
| Z | 100 ms | { -17, 13 } |
| ZH | 100 ms | { -17, 8 } |
| CH | 70 ms | { -10, 4 } |
| JH | 70 ms | { -10, 0 } |
| L | 100 ms | { -10, -3 } |
| R | 100 ms | { -13, 4 } |
| Y | 100 ms | { -13, 0 } |
| W | 100 ms | { -13, -3 } |
| IY | 150 ms | { -17, 4 } |
| IH | 100 ms | { -17, 0 } |
| EH | 100 ms | { -17, -3 } |
| AE | 100 ms | { 18 } |
| UW | 150 ms | { 0 } |
| UH | 100 ms | { -17 } |
| AH | 100 ms | { -10, 4, 8 } |
| AA | 150 ms | { -13, 4, 8 } |
| AO | 150 ms | { -17, 4, 8 } |
| EY | 150 ms | { -10, 0, 8 } |
| AY | 150 ms | { -13, 0, 8 } |
| OY | 150 ms | { -17, 0, 8 } |
| AW | 150 ms | { -10, -4, 8 } |
| OW | 150 ms | { -13, -4, 8 } |
| ER | 100 ms | { -17, -4, 8 } |

Figure 9

Variations of Acoustic Symbol Set Arrangements for the Phone Number 987-654-3210

Examples of Final Compositions

Examples of Final Compositions

SYSTEM AND METHOD FOR PROVIDING PARTICULARIZED AUDIBLE ALERTS

CROSS-REFERENCE TO RELATED APPLICATIONS

This application claims the benefit under 35 U.S.C. §119(e) of U.S. Patent Application No. 60/568,083 filed May 3, 2004, for "SYSTEM AND METHOD FOR PROVIDING PARTICULARIZED AUDIBLE ALERTS", which is hereby incorporated by reference.

BACKGROUND OF THE INVENTION

1. Field of the Invention

The present invention relates to providing distinctive audible alerts, and more particularly, to generating particularized audible alerts in response to receiving a telephone call.

2. Description of the Related Art

During the past few years the usage of electronic means for human communications has expanded rapidly. Numerous end user electronic devices used for such communication emit audible sounds to alert their owners or users of an incoming communication. As electronic communication devices become more commonplace, and as people use these devices more often, two problems have arisen. First, many people find frequent non-urgent communications disruptive because other activities are interrupted. Therefore there is a need to obtain information pertaining to the incoming communication prior to deciding whether or not to respond immediately. The second problem is confusion that often results in situations where two or more people each carrying a portable communication device are in close proximity to each other, and at least one person's device emits an audible alert. Often, at least one person whose communication device has not emitted an alert hears a nearby alert and erroneously attempts to accept a communication that doesn't involve their device. This, again, is a distraction and inconvenience.

Digital displays showing caller ID, in principle, address both of the above problems, but require the user to handle and/or look at the device. Again, this is distracting, disruptive, and/or inconvenient. Personalized ring tones, or audible alerts, help people distinguish an alert from their device from those of other people's devices. However, many people find the available rings/alerts irritating or "silly sounding". Also, some individuals are not inclined to activate this feature or simply never learn how to use their phone's advanced features including personalized ring tones, or audible alerts.

Lastly, many phones today are capable of distinctive ringing, a feature whereby users can assign specific rings or alert sounds to each contact in their phone's contacts list. Many customers like this feature in principle, but don't actually use it because of practical shortcomings. Generally, today's distinctive rings/alerts require a cumbersome and time consuming setup, and they can only be assigned to a person or number after a corresponding contact has been entered (usually manually) into the phone's contacts list. Many people find the available rings/alerts irritating or "silly sounding", and in crowded settings, often miss calls when they fail to recognize the less familiar alerts of infrequent callers. Finally, many customers simply never learn how to use their phone's advanced features including distinctive ringing.

SUMMARY OF THE INVENTION

In contrast, an audible alert as described in conjunction with various embodiments does not require setup or a contacts list. Caller ID (and/or other information) is conveyed through acoustic variations to the ring/alert. A desirable feature of the audible alert is that it can sound generally like a conventional phone and yet be distinctly recognizable to its owner. The sound of the alert may be altered (to musical instruments or bird calls for example) via user preferences without adversely affecting its information content.

When a person first gets an electronic device enabled with embodiments of an alert capability, he/she will notice that its ring/alert is a little different from that of other electronic devices including others of the same kind and similarly enabled. They will quickly come to recognize their own ring/alert including the subtle, yet distinct, differences for each caller or contact. Within a very short time, it will be possible to recognize callers/contacts by the sound of their rings/alerts. Importantly, with millions of different ways to create the subtle yet distinct differences, people will not be able to recognize the information imbedded in the rings/alerts of other people's devices. The resulting privacy for the owner of the phone, and anonymity for the caller is another advantage of alerts using the technology associated with various embodiments.

In one embodiment, there is a method of generating at least two distinctive auditory alerts upon receiving a telephone call at a device, the method comprising accessing data indicative of a first plurality of sounds corresponding to a user of a device, the device configured to receive a telephone call; playing the first plurality of sounds at the device so as to identify a received telephone call being directed to the user; accessing a telephone number or a subscriber name associated with a calling party of the telephone call; retrieving data indicative of a second plurality of sounds designating the calling party based on the telephone number or subscriber name; and playing the second plurality of sounds at the device so as to identify the calling party. Prior to the accessing, the method may additionally comprise assigning data indicative of the first plurality of sounds corresponding to the user of the device, wherein the data corresponds to a sequence of phonemes associated with the user. Playing the first plurality of sounds may comprise playing a portion of the first plurality of sounds concurrently. Playing the second plurality of sounds may comprise playing a portion of the second plurality of sounds concurrently. Playing the first plurality of sounds is repeated, after a time interval, for a first predetermined number of times. Playing the second plurality of sounds is repeated, after a time interval, for a second predetermined number of times.

Playing the first plurality of sounds in the method may be followed by a predetermined period of silence and playing the second plurality of sounds, and where the first plurality of sounds, the predetermined period of silence and the second plurality of sounds is repeated, after a time interval, for a predetermined number of times. Playing the second plurality of sounds may be followed by a predetermined period of silence and playing the first plurality of sounds, and where the first plurality of sounds, the predetermined period of silence and the second plurality of sounds is repeated, after a time interval, for a predetermined number of times. The number of sounds in the first and second plurality of sounds may be selected from a group of less than seven unique sounds, and where the sounds in the first and second plurality of sounds are played individually or in combinations, having up to 63 combinations or composite sounds. The number of sounds in the first and second plurality of sounds may be selected from a group of less than ten unique sounds. The first or second plurality of sounds may be either six or nine sounds.

The sounds in the first plurality of sounds of the method may correspond to a first set of selected notes. The sounds in the second plurality of sounds may correspond to a second set of selected notes. The sounds in the first plurality of sounds and the second plurality of sounds may correspond to a predetermined set of notes or chords. The sounds in the first plurality of sounds and the second plurality of sounds may correspond to a set of outputs from a speech engine. Each sound may lack spectral and temporal complexity and variability of natural phonemes.

The device of the method may comprise a mobile telephone, a wireless telephone, a pager, or a two-way radio. The device may comprise a computing device with a telephone call capability. Accessing the telephone number may comprise automatically retrieving the telephone number associated with the calling party of the telephone call at the device. The telephone number may comprise a caller number identification (CNID), an automatic number identification (ANI), or a calling party's number (CPN). Retrieving may comprise indexing a data structure based on the telephone number or subscriber name. The data structure may be a list, array or table, or may be a database. Retrieving may comprise applying a transformation based on the telephone number or subscriber name. The transformation may comprise rules for arranging and/or parsing the telephone number, and may additionally comprise assigning phonic symbols to the arranged and/or parsed telephone number. The transformation may comprise rules assigning phonic symbols based on the subscriber name, and the assigned phonic symbols may correspond to phonemes of the subscriber name.

The method may additionally comprise assigning default sounds for the second plurality of sounds. The method may additionally comprise assigning default sounds for the first and second plurality of sounds. The method may additionally comprise automatically assigning a particular second plurality of sounds to the telephone number of the calling party. The method may additionally comprise additionally comprising storing the assigned particular second plurality of sounds and the corresponding telephone number of the calling party in the data structure. The method may additionally comprise automatically assigning a particular second plurality of sounds corresponding to the calling party.

The method may additionally comprise assigning default sounds for the first plurality of sounds. The user may select the sounds of the first plurality of sounds. The user may select a type of sound via a user interface. The first plurality of sounds may correspond to one instrument and the second plurality of sounds may correspond to a second instrument. The first plurality of sounds and the second plurality of sounds may correspond to the same instrument. The first plurality of sounds may correspond to multiple instruments and the second plurality of sounds may correspond to one instrument. The first plurality of sounds may correspond to one instrument and the second plurality of sounds may correspond to multiple instruments.

The method may additionally comprise selecting the first plurality of sounds corresponding to a user prior to accessing the data indicative of the first plurality of sounds. The selecting may comprise randomly generating the first plurality of sounds, or may comprise receiving a user input. The selecting may further comprise applying transformations based on the user input. The selecting may comprise obtaining a user identifier based on a dialed number identification service (DNIS) corresponding to the telephone call, and may further comprise applying transformations based on the user identifier. The method may additionally comprise storing the selected first plurality of sounds in a memory.

In another embodiment, there is a method of generating at least two distinctive auditory alerts upon receiving a telephone call at a device, the method comprising playing a first plurality of sounds at a device so as to identify a received telephone call being directed to a user of the device, accessing a telephone number or subscriber name associated with a calling party of the telephone call, retrieving data indicative of a second plurality of sounds corresponding to the calling party based on the telephone number or subscriber name, and playing the second plurality of sounds at the device so as to identify the calling party. Playing the first plurality of sounds may be followed by a predetermined period of silence and playing the second plurality of sounds, and where the first plurality of sounds, the predetermined period of silence and the second plurality of sounds may be repeated, after a time interval, for a predetermined number of times. Alternatively, playing the second plurality of sounds may be followed by a predetermined period of silence and playing the first plurality of sounds, and where the first plurality of sounds, the predetermined period of silence and the second plurality of sounds may be repeated, after a time interval, for a predetermined number of times.

Retrieving in the method may comprise indexing a data structure based on the telephone number or subscriber name, where the data structure may be a list, array, table, or database. Retrieving may comprise applying a transformation based on the telephone number or subscriber name. The transformation may comprise rules for arranging and/or parsing the telephone number, or rules assigning phonic symbols based on the subscriber name. The method may additionally comprise assigning phonic symbols to the arranged and/or parsed telephone number, where the assigned phonic symbols correspond to phonemes of the arranged and/or parsed telephone number or the subscriber name.

The first plurality of sounds may correspond to one instrument and the second plurality of sounds may correspond to a second instrument. The first plurality of sounds may correspond to multiple instruments and the second plurality of sounds may correspond to one instrument, or the first plurality of sounds may corresponds to one instrument and the second plurality of sounds may correspond to multiple instruments, or both the first and second plurality of sounds may correspond to multiple instruments.

In another embodiment, there is a method of generating at least two distinctive auditory alerts upon receiving a telephone call at a device, the method comprising accessing data indicative of a first plurality of sounds corresponding to a user of a device, the device configured to receive a telephone call, playing the first plurality of sounds at the device so as to identify a received telephone call being directed to the user, accessing an identifier associated with a calling party of the telephone call, retrieving data indicative of a second plurality of sounds designating the calling party based on the identifier, and playing the second plurality of sounds at the device so as to identify the calling party. Accessing the identifier may comprise automatically retrieving the identifier associated with the calling party from a signaling portion of the telephone call.

Retrieving in the method may comprise indexing a data structure based on the identifier. The method may additionally comprise automatically assigning a particular second plurality of sounds to the identifier of the calling party, where the particular second plurality of sounds may be randomly generated. The method may additionally comprise storing the assigned particular second plurality of sounds and the corresponding identifier of the calling party in the data structure. Retrieving may comprise applying a transformation based on the identifier. The transformation may comprise rules for arranging and/or parsing the identifier, or rules assigning phonic symbols based on the identifier. Alternatively, the transformation may comprise rules for randomly arranging and/or parsing the identifier, or rules assigning random phonic symbols based on the identifier.

The method may additionally comprise selecting the first plurality of sounds corresponding to a user prior to accessing the data indicative of the first plurality of sounds. The selecting may comprise randomly generating the first plurality of sounds. The selecting may comprise receiving a user input, and where the selecting may further comprise applying transformations based on the user input. The method may additionally comprise storing the selected first plurality of sounds in a memory.

In another embodiment, there is a method of generating at least two distinctive auditory alerts upon receiving a transmission at a communication device, the method comprising accessing data indicative of a first plurality of sounds corresponding to a user of a communication device, the communication device configured to receive a transmission, playing the first plurality of sounds at the communication device so as to identify a received transmission being directed to the user, accessing an identifier associated with a transmitting party of the transmission, retrieving data indicative of a second plurality of sounds designating the transmitting party based on the identifier, and playing the second plurality of sounds at the device so as to identify the transmitting party. The transmission may be an electronic mail, or may be a telephone call. The transmission may be a short messaging service or a multi-media messaging service transmission. The transmission may be a paging transmission. The transmission may comprise text, or may comprise a picture.

The transmission of the method may comprise a signaling portion including the identifier associated with the transmitting party of the transmission. The identifier may comprise a name of the transmitting party. The identifier may comprise a caller number identification, automatic number identification, or calling party's number of the transmitting party. The identifier may comprise an Internet protocol address of the transmitting party, or may comprise an electronic-mail address of the transmitting party.

In another embodiment, there is a method of generating a distinctive auditory alert upon receiving a telephone call at a device, the method comprising accessing a telephone number or subscriber name associated with a calling party of a telephone call, retrieving data indicative of a plurality of sounds designating the calling party based on the telephone number or subscriber name, and playing the plurality of sounds at the device so as to identify the calling party. A user of the device may not select the sounds of the plurality of sounds. Retrieving may comprise indexing a data structure based on the telephone number or subscriber name, where the data structure may be a list, array, table, or database. Retrieving may comprise applying a transformation based on the telephone number or subscriber name. The transformation may comprise rules for arranging and/or parsing the telephone number, or rules assigning phonic symbols based on the subscriber name. The method may additionally comprise assigning phonic symbols to the arranged and/or parsed telephone number, where the assigned phonic symbols correspond to phonemes of the arranged and/or parsed telephone number or the subscriber name. The method may additionally comprise automatically assigning a particular plurality of sounds to the telephone number of the calling party. The method may additionally comprise storing the assigned particular plurality of sounds and the corresponding telephone number of the calling party in the data structure.

The method may additionally comprise automatically assigning a particular plurality of sounds corresponding to the calling party. The plurality of sounds for each calling party may be played in a sequence. Two or more sounds may overlap at one or more predetermined times in the sequence. The sequence of the plurality of sounds may be unique for each calling party. The plurality of sounds may correspond to one instrument, or alternatively, the plurality of sounds may correspond to multiple instruments, and where the sounds of the multiple instruments may overlap at times.

In another embodiment, there is a method of generating a distinctive auditory alert upon receiving a telephone call at a device, the method comprising accessing a telephone number or subscriber name associated with a calling party of a telephone call, automatically assigning a particular plurality of sounds to correspond to the telephone number or subscriber name of the calling party, and playing the plurality of sounds at the device so as to identify the calling party. A user of the device may not select the sounds of the plurality of sounds. Automatically assigning may comprise applying transformations based on the telephone number or subscriber name. The transformations may comprise arranging and/or parsing the telephone number. The method may additionally comprise assigning phonic symbols to the arranged and/or parsed telephone number. The transformations may comprise assigning phonic symbols based on the subscriber name. The assigned phonic symbols may correspond to phonemes of the subscriber name.

The method may additionally comprise assigning each calling party a unique plurality of sounds to be played in a sequence. Two or more sounds may overlap at one or more predetermined times in the sequence. The method may additionally comprise storing the assigned particular plurality of sounds and the corresponding telephone number or subscriber name of the calling party in a data structure associated with the device. The data structure may be a list, array, table, or database. In a subsequent telephone call to the device from a calling party that has previously called the device, the method may additionally comprise indexing the data structure based on the telephone number or subscriber name of the calling party to retrieve the assigned plurality of sounds designating the calling party, and playing the plurality of sounds in a sequence at the device so as to identify the calling party.

In another embodiment, there is a method of generating a distinctive auditory alert upon receiving a transmission at a communication device, the method comprising accessing an identifier associated with a transmitting party of a transmission, automatically assigning a particular plurality of sounds to correspond to the identifier of the transmitting party, and playing the plurality of sounds at the device so as to identify the transmitting party. The transmission may comprise a signaling portion including the identifier associated with the transmitting party of the transmission. The identifier may comprise a name of the transmitting party. The identifier may comprise a caller number identification, automatic number identification, or calling party's number of the transmitting party. The identifier may comprise an Internet protocol address of the transmitting party, or may comprise an electronic-mail address of the transmitting party.

In another embodiment, there is a system for generating at least two distinctive auditory alerts upon receiving a telephone call, the system comprising: data indicative of a first plurality of sounds designating a user of a device, the device configured to receive a telephone call; a sound generator at the device configured to play the first plurality of sounds in a sequence so as to identify a received telephone call being directed to the user; a telephone number module configured to access a telephone number or subscriber name associated with a calling party of the telephone call; and means for providing data indicative of a second plurality of sounds designating the calling party based on the accessed telephone number or subscriber name, where the sound generator is further configured to play the second plurality of sounds in a sequence so as to identify the calling party. The means for providing may comprise a data structure indexed by the accessed telephone number or subscriber name. The telephone number module may access a caller number identification (CNID), an automatic number identification (ANI), or a calling party's number (CPN). The data structure may be a list, array, table, or database. The means for providing may comprise means for applying transformations based on the accessed telephone number or subscriber name. The transformations may comprise rules for arranging and/or parsing the telephone number, or rules assigning phonic symbols based on the subscriber name. The first plurality of sounds may correspond to one instrument and the second plurality of sounds may correspond to a second instrument. The first plurality of sounds may correspond to multiple instruments and the second plurality of sounds may correspond to one instrument, or the first plurality of sounds may correspond to one instrument and the second plurality of sounds may correspond to multiple instruments. Two or more sounds of the second plurality of sounds may overlap at one or more predetermined times in the sequence.

In another embodiment, there is a system for generating at least two distinctive auditory alerts upon receiving a telephone call, the system comprising a first plurality of sounds indicative of a user of a device, the device configured to receive a telephone call; and a second plurality of sounds indicative of a calling party of the received telephone call, wherein the device is configured to play the first plurality of sounds in a sequence so as to identify the received telephone call being directed to the user, access a telephone number or subscriber name associated with the calling party of the received telephone call, and play the second plurality of sounds in a sequence so as to identify the calling party. The device may comprise a data structure indexed by the accessed telephone number or subscriber name. The device may comprise a module configured to apply transformations based on the accessed telephone number or subscriber name. The device may comprise a memory configured to store the first plurality of sounds indicative of the user of the device.

In another embodiment, there is a telephonic device comprising means for producing an acoustic representation of a message, the acoustic representation comprising acoustic symbols, the acoustic symbols representing phonemes of a language, where the acoustic symbols comprise combinations of sounds, single sounds, and/or silence, and where the acoustic symbols are produced in a temporal order consistent with the language. The device may additionally comprise an audible alert/ringer, where the alert/ringer may be configured to generate an acoustic representation of a message. The message may comprise information regarding an incoming call. The information may comprise a caller ID of the incoming call. The message may comprise the name of an owner of the telephonic device. The message may comprise the name of the telephonic device.

The telephonic device may additionally comprise means for assigning the combinations of sounds or the single sounds to the acoustic symbols. The means for assigning the combinations of sounds or the single sounds to the acoustic symbols may comprise means for randomly assigning the combinations of sounds or the single sounds to the acoustic symbols. The means for assigning the combinations of sounds or the single sounds to the acoustic symbols may further comprise means for a user to assign the combinations of sounds or the single sounds to the acoustic symbols. The telephonic device may additionally comprise a transmitter of the acoustic representation of a message and a receiver of the acoustic representation of a message. The telephonic device may comprise a mobile telephone, a wireless telephone, a pager, or a two-way radio.

In another embodiment, there is a method of generating a distinctive auditory alert upon receiving a telephone call at a device, the method comprising accessing data indicative of a plurality of sounds in a sequence corresponding to a user of a device, the device configured to receive a telephone call, and playing the plurality of sounds in the sequence at the device so as to identify a received telephone call being directed to the user. The plurality of sounds may comprise combinations of notes. The combinations of notes may at least partially overlap in time. The method, prior to the accessing, may additionally comprise assigning data indicative of a plurality of sounds in the sequence corresponding to the user of the device, where the plurality of sounds in the sequence correspond to a phone number of the device. The method, prior to the accessing, may additionally comprise assigning data indicative of a plurality of sounds in the sequence corresponding to the user of the device, where the plurality of sounds in the sequence correspond to a name of the user.

The method, prior to the accessing, may additionally comprise assigning data indicative of a plurality of sounds in the sequence corresponding to the user of the device, where the plurality of sounds in the sequence correspond to one or more words selected by the user. The method, prior to the accessing, may additionally comprise assigning data indicative of a plurality of sounds in the sequence corresponding to the user of the device, where the data corresponds to a sequence of phonemes associated with the user. The plurality of sounds in the sequence corresponding to the user may be unique to the user.

In yet another embodiment, there is a method of generating a distinctive auditory alert upon receiving a transmission at a communication device, the method comprising accessing data indicative of a plurality of sounds in a sequence corresponding to a user of a communication device, the communication device configured to receive a transmission, where the plurality of sounds comprises combinations of notes, and where the combinations of notes at least partially overlap in time; and playing the plurality of sounds in the sequence at the device so as to identify a received transmission being directed to the user. The transmission may be an electronic mail, a telephone call, a short messaging service or a multi-media messaging service transmission, or a paging transmission. The transmission may comprise text, or may comprise a picture. The transmission may comprise a signaling portion including an identification of an originator of the transmission. The identification may comprise a name of the originator of the transmission. The identification may comprise a caller number identification, automatic number identification, or calling party's number of the originator of the transmission. The identification may comprise an Internet protocol address of the originator of the transmission, or may comprise an electronic-mail address of the originator of the transmission. The communication device may comprise a mobile telephone, a wireless telephone, a pager, or a two-way radio.

The communication device may comprise a personal computer, a portable computer, a hand-held computing device, or a wearable computing device.

BRIEF DESCRIPTION OF THE DRAWINGS

FIG. 1A is a diagram illustrative of problems with conventional audible alerts.

FIG. 3 is a diagram of an exemplary screen used for selecting potential preference options in an embodiment of process 210 shown in FIG. 2A.

FIG. 6B is a diagram of an alternative representation of the exemplary assignment of acoustic symbols to a character set shown in FIG. 6A.

FIG. 8 is a diagram of English language phonemes as can be used by process 730 shown in FIG. 7.

FIG. 9 is a diagram of an exemplary assignment of acoustic symbols to phonemes as used by certain embodiments of the system and method.

DETAILED DESCRIPTION OF CERTAIN EMBODIMENTS

Figure 1B:
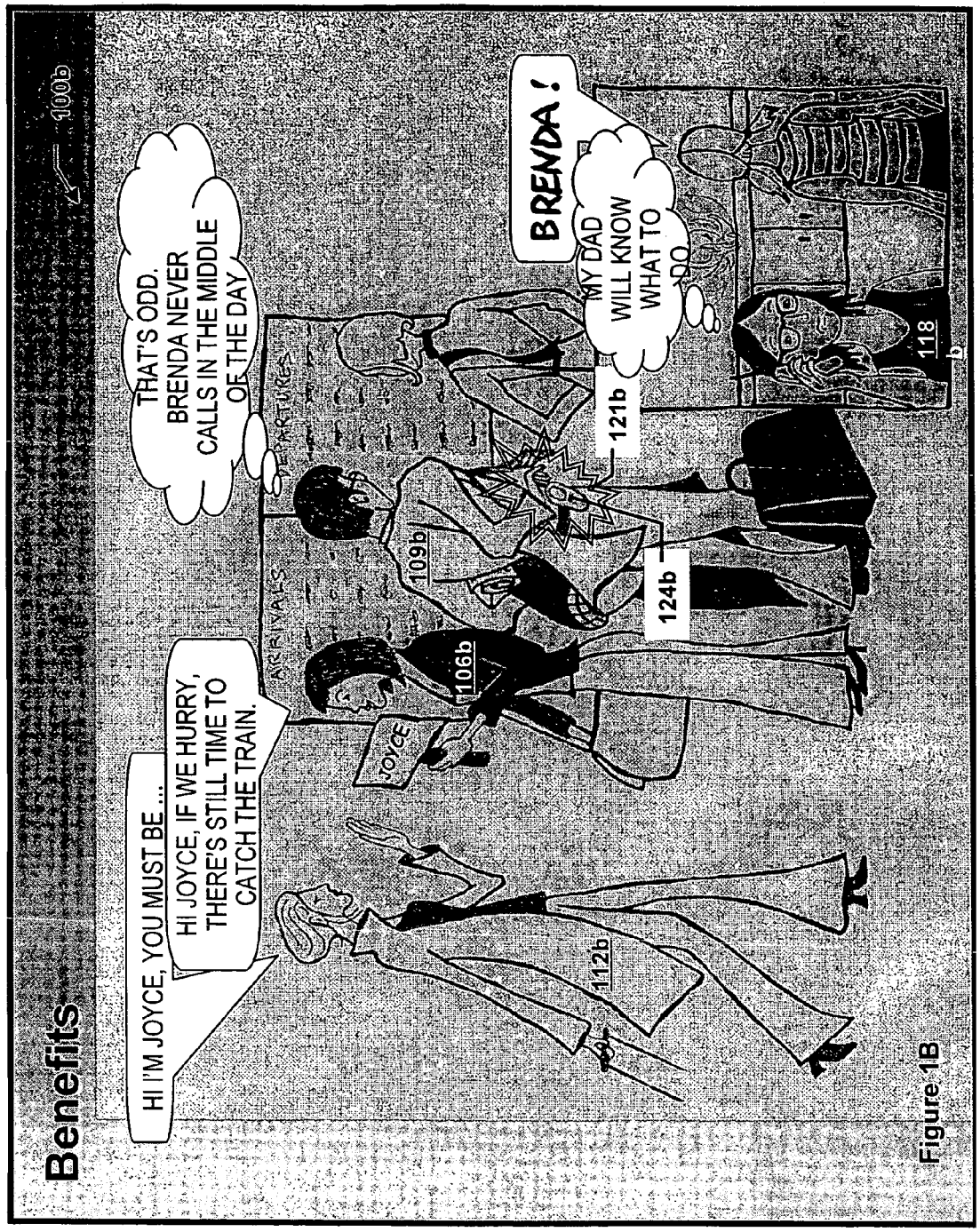
FIG. 1B is a diagram illustrative of benefits achieved by certain embodiments of the present invention.

The following detailed description of certain embodiments presents various descriptions of specific embodiments of the present invention. However, the present invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The system is comprised of various modules, tools, and applications as discussed in detail below. As can be appreciated by one of ordinary skill in the art, each of the modules may comprise various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system modules, tools, and applications may be written in any programming language such as, for example, C, C++, BASIC, Visual Basic, Pascal, Ada, Java, HTML, XML, or FORTRAN, and executed on an operating system, such as variants of Windows, Macintosh, UNIX, Linux, VxWorks, or other operating system. C, C++, BASIC, Visual Basic, Pascal, Ada, Java, HTML, XML and FORTRAN are industry standard programming languages for which many commercial compilers can be used to create executable code.

FIG. 1A illustrates certain problems 100a addressed by certain but not all embodiments of the present invention. First, audible alerts emitted by different electronic devices can be difficult to discern from one another. This in turn can result in distraction and confusion as illustrated by a dark haired woman 106a failing to meet up with Joyce 112a as she 106a attempts to answer her phone 103a, erroneously thinking that a conventional audible alert 115a had been emitted by her phone 103a. Second, as personal electronic communication becomes increasingly ubiquitous in its various forms, a need is developing for people to discriminate between communications that are important to them and those which are merely a nuisance or simply not urgent. This is illustrated by the dark haired man, Jim 109a, hearing his phone's conventional audible alert 115a, but failing to answer his daughter 118a Brenda's call believing it was unimportant and not wanting to be bothered with his hands full.

Various embodiments include an audible alert. The audible alert includes elements distinctive to the intended recipient and/or initiator (likely device(s) or account(s)) of a communication or transmission. This eliminates confusion and distraction associated with audible alerts intended for other people as illustrated in FIG. 1B. In this scene 100b, the dark haired woman 106b, not distracted by someone else's audible alert 121b, meets up with Joyce 112b. The two head happily off to the train terminal. FIG. 1B also illustrates how the caller's identity embedded in the audible alert 121b of Jim's phone 124b lets Jim 109b know that the call is from his daughter Brenda 118b. With this information he decides that the call should be answered then and there.

The audible alerts can be automatically generated, eliminating the need for programming or assigning by the user. They can be automatically individualized so that only the owner of an electronic device will be able to easily recognize the information content of its audible alert. Also, the information containing portion of the alert can be created using different kinds of sounds including musical notes and conventional phone ring sounds, for example.

Although it is possible for people to select different kinds of sounds to be used for their audible alert, bird songs or human voice for example, it is also possible for millions of people to use the same kind of sound, such as conventional phone ring sounds, without duplicating any individual's alert code.

Therefore, in a setting where several people each possess the same model of phone, and one person's phone rings, that person will know that is their phone as well as who is trying to reach them. The others will know only that is not their phone that is ringing. This scenario is basically unaffected by whether or not the individuals in the setting have personalized or otherwise altered the factory settings on their phone.

Figure 2A:
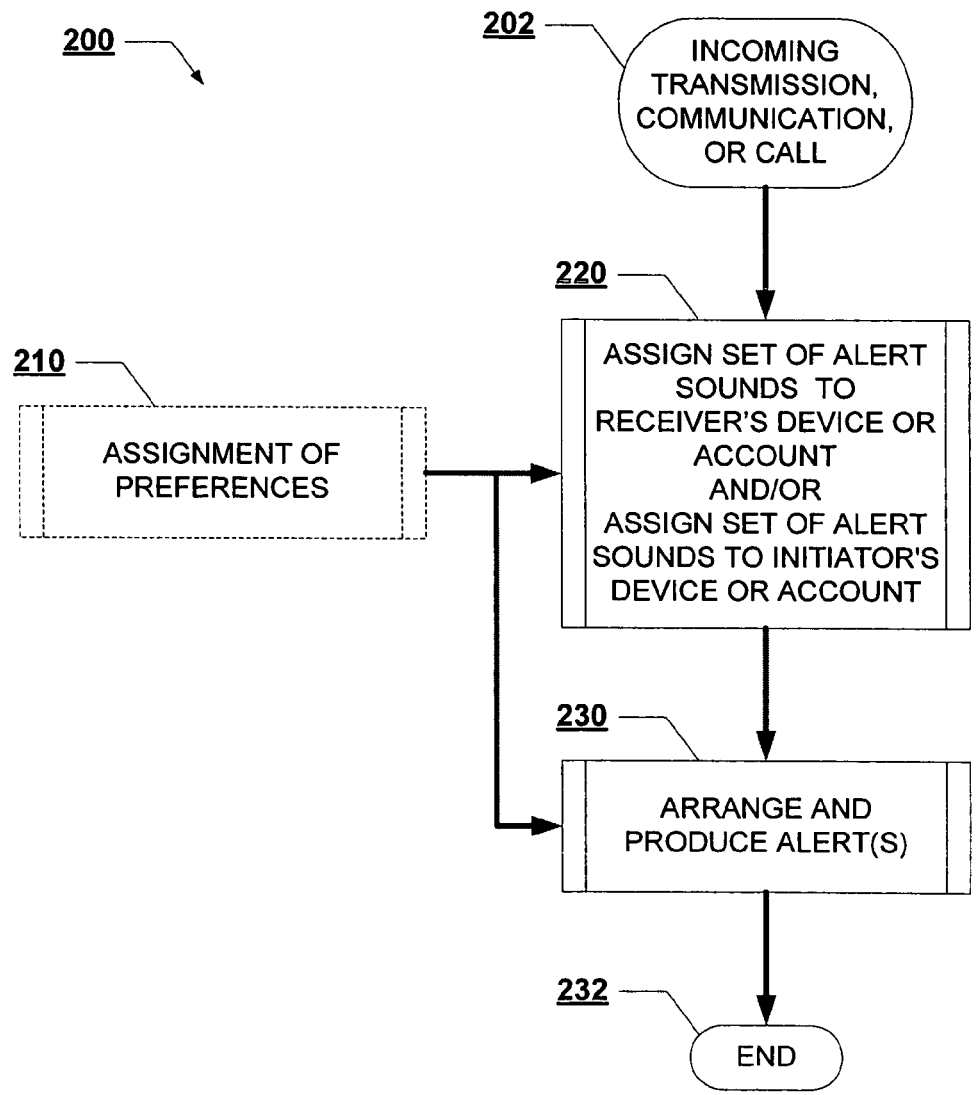
FIG. 2A is flow diagram of an overview of exemplary processes used in an embodiment of the system and method.

FIG. 2A provides an overview of the basic components of an embodiment 200. Depending on the embodiment, additional states and/or processes may be added, others removed, and the ordering of the states and processes rearranged. Specifically, a transmission, communication, or call 202 being sent to a communication device is assigned a set of alert sounds or acoustic symbols indicative of the intended recipient or initiator or both by a process 220. The sounds or acoustic symbols can be derived from and assigned to phonemes or letters comprising names or labels. They can also be derived from and assigned to numbers or digits. Arbitrary assignments are also contemplated. Sounds indicative of other types of information may also be assigned by the process 220. The alert sounds are then temporally arranged, and produced in a process 230. An optional assignment of preferences process 210 is included mainly to add clarity. The processes 210, 220 and 230 acting on the incoming transmission, communication or call 202 can be performed by many devices, such as hand-held computing devices, laptop computers, portable computers, personal digital assistants (PDAs), wearable computing devices, mobile telephones, pagers, and so forth. A client/server configuration can be utilized where preferences and options from process 210 can be made and stored via one or more servers. Alternatively, the preferences can be made via a user interface on the user (client) device and stored at the device or additionally at one or more servers. For example, a custom alert sound can be generated via the user interface on the user device and stored at the user device, the server, or both.

Figure 2B:
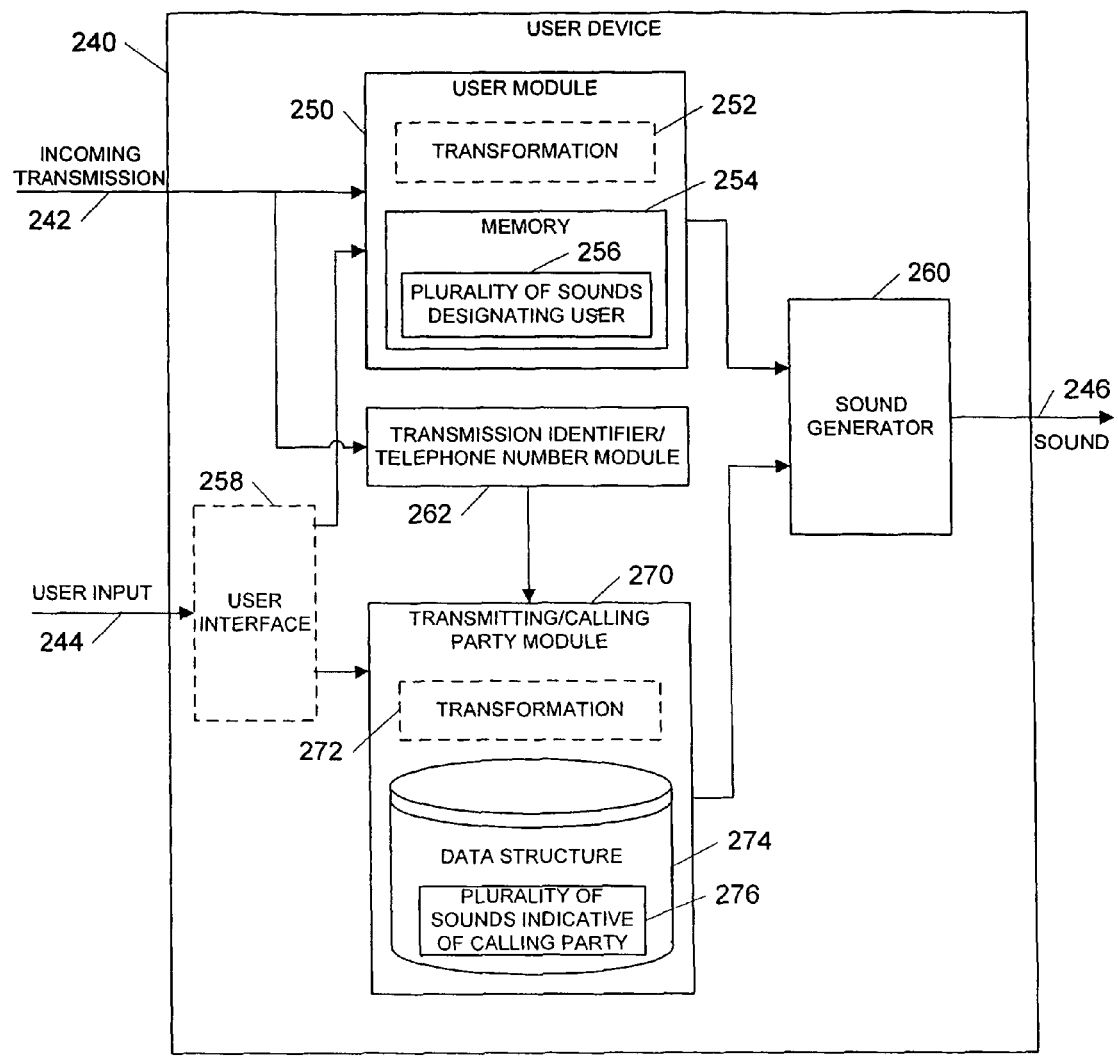
FIG. 2B is block diagram of an exemplary configuration of components in one embodiment of the system.

FIG. 2B illustrates an exemplary configuration of components in one embodiment of the system. The system can be configured to generate at least two distinctive auditory alerts or sounds 246 indicative of the intended recipient and initiator, one auditory alert indicative of the intended recipient, or one auditory alert indicative of the initiator upon receiving a transmission or telephone call 242. A user communication device 240, such as described above, receives an incoming transmission 242, such as a telephone call, and optional user input 244, such as described in conjunction with FIG. 3 below. The user device 240 includes a user module 250 and a transmitting/calling party module 270, one of which can be optional if the device is configured to only provide an auditory alert indicative of the intended recipient or the initiator. The incoming transmission 242 is provided to the user module 250 and to a transmission identifier or telephone number module 262 for processing, as will be described below. The transmission identifier or telephone number module 262 processes its input and provides output signals to the transmitting/calling party module 270. For example, the transmission identifier or telephone number module 262 can access a telephone number or subscriber name associated with a calling party of a telephone call. The user input 244 is provided to an optional user interface 258 that sends output signals to the user module 250 and/or the transmitting/calling party module 270 to indicate preferences of the user. The user module 250 and/or the transmitting/calling party module 270 provide data indicative of a first plurality of sounds and a second plurality of sounds, respectively, to a sound generator 260, which generates the sound 246 output from the user device 240.

Further referring to FIG. 2B, the user module 250 includes an optional transformation process 252 that can process the incoming transmission 242, as will be described below. The user module 250 further includes software code that accesses a memory 254 that contains data indicative of a first plurality of sounds designating a user 256 of the device 240. The transmitting/calling party module 270 includes an optional transformation process 272 that can process the incoming transmission identifier or telephone number from module 262, as will be described below. The transmitting/calling party module 270 further includes software code that accesses a data structure 274, such as a list, array, table or database, which contains data indicative of a second plurality of sounds designating the calling party 276 based on the accessed telephone number, subscriber name, or transmission identifier. The sound generator 260 plays the first plurality of sounds in a sequence so as to identify a received transmission or telephone call as being directed to the user, and/or plays the second plurality of sounds in a sequence so as to identify the transmitting or calling party.

Figure 2C:
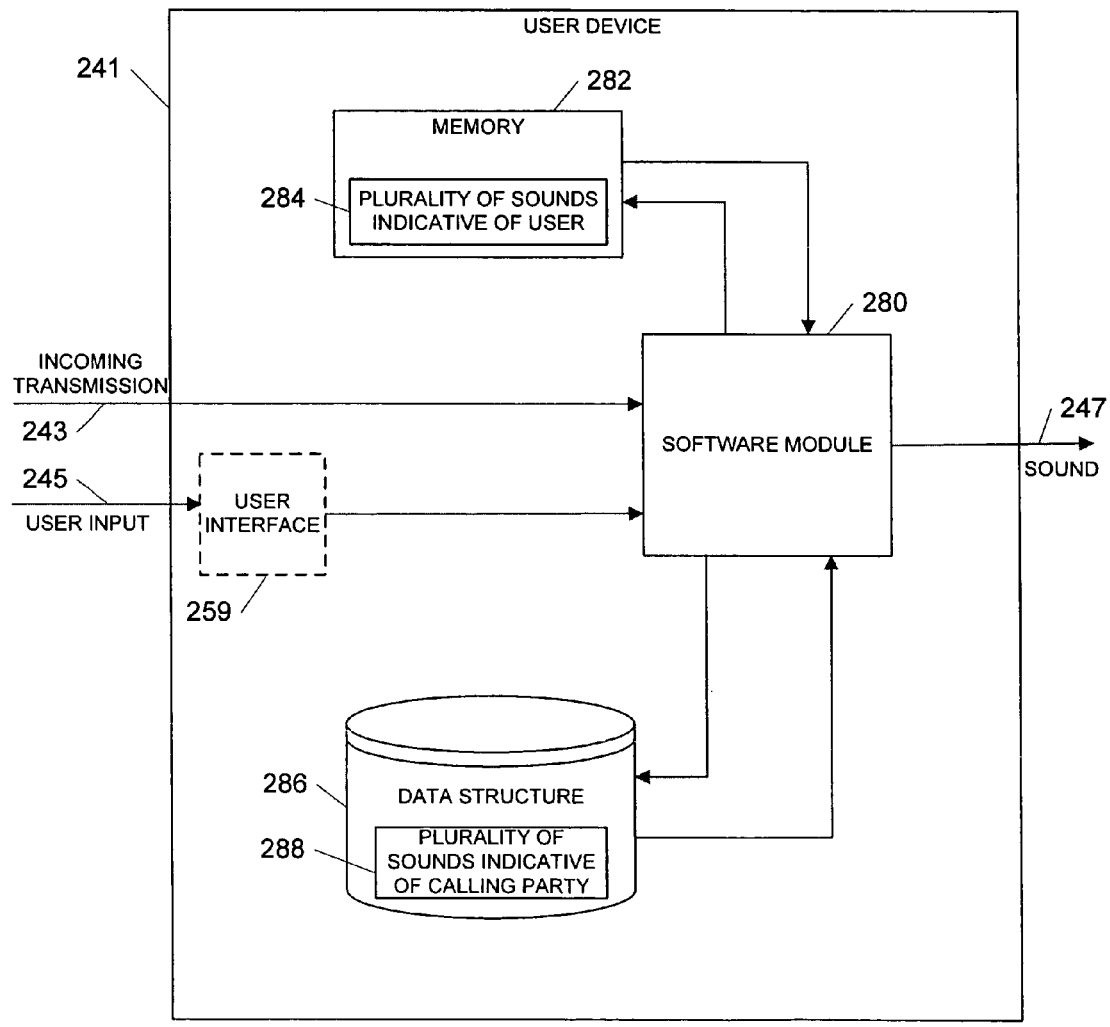
FIG. 2C is block diagram of an exemplary configuration of components in another embodiment of the system.

FIG. 2C illustrates an exemplary configuration of components in another embodiment of the system. The system can be configured to generate at least two distinctive auditory alerts or sounds 247 indicative of the intended recipient and initiator, one auditory alert indicative of the intended recipient, or one auditory alert indicative of the initiator upon receiving a transmission or telephone call 243. A user communication device 241, such as described above, receives the incoming transmission 243, such as a telephone call, and optional user input 245. The user device 241 includes a software module 280 that receives the incoming transmission 243 for processing. The user input 245 is provided to an optional user interface 259 that sends signals to the software module 280 to indicate preferences of the user. The software module 280 generates the sound 247 output from the user device 241.

The software module 280 executed by the device 241 can play a first plurality of sounds in a sequence so as to identify a received transmission or telephone call being directed to the user. This can be done by accessing a memory 282 having data indicative of the first plurality of sounds designating the user 284. The software module 280 can obtain or derive a telephone number, subscriber name or transmission identifier associated with a transmitting or calling party of a telephone call from the incoming transmission 243. A data structure 286, such as a list, array, table or database, can provide data indicative of a second plurality of sounds designating the transmitting or calling party. The software module 280 can include a transformation process or module to optionally transform the incoming transmission 243. The software module 280 can further play the second plurality of sounds in a sequence so as to identify the transmitting or calling party.

FIG. 3 illustrates example embodiments of a user selection screen or screens for selecting potential preference options, previously shown as process 210 (FIG. 2A), that could be presented to a user of a communication device equipped with an alert capability. In one embodiment, a display for presenting the screen or screens of the user interface is part of the user device, such as device 124*b* (FIG. 1B). It is to be appreciated that depending on the embodiment, particular fields or parts thereof on the screen may be added, removed, and the ordering of the fields rearranged. The screens may be in the form of one or more menus, dialog boxes and so forth. In a first section 303, the user can decide if their alert should convey information pertaining to the receiver, the initiator, a type of communication, a type of contact, or any combination thereof. Examples of information pertaining to the receiver include phone numbers, device identification numbers, electronic addresses, user accounts, routing information, the Dialed Number Identification Service (DNIS), and the like as well as associated information, such as assigned labels and names. Examples of information pertaining to the initiator include phone numbers, device identification numbers, electronic addresses, user accounts, routing information, the Automatic Number Identification (ANI), and the like as well as associated information, such as assigned labels and names. Examples of information categories pertaining to the type of communication include voice, text, Short Text Message (STM), reminder, email, picture, priority, and the like. Examples of information categories pertaining to the type of contact include friend, family, business, unassigned, first time caller, caller ID blocked, urgent, not urgent, and the like.

In a next section 306, the user can select an aspect of the available information from which the alert will be derived. Examples include, but are not limited to: "NAME (PHONIC)", alerts will be derived from the phonetic structure of names or words; "NAME (SPELLING)", alerts will be derived from the written or printed structure of names or words; "PHONE NUMBER", alerts will be derived from the digits comprising a phone number; "EMAIL ADDRESS", alerts will be derived from the characters comprising an email address; "CUSTOM", alerts will constructed manually by the user; "CONTACT CATEGORY", alerts will be derived a contact category. Other examples include date of first communication, arbitrary assignment, time zone of initiator, and so forth. In this example of process 210, a selection from section 306 determines which aspect of available information to derive the alert from and applies to both the initiator and the receiver. However, it is possible to provide the feature where such variables would be independently selectable. For example, in a situation involving two telephonic devices, receiver indicative information can be derived from (or convey) the phone number associated with the device used to receive the communication and the initiator specific information can be derived from (or convey) the phonetic structure of the name or contact associated with a phone number derived from the ANI of the incoming call. Alternatively, the phone number can be derived from a caller number identification (CNID) or a calling party's number (CPN) associate with the call.

As with section 306, sections 309, 312, 315, and 318 are examples of preferences that may be applied independently to various aspects of an alert according to certain embodiments. However, the illustration of FIG. 3 shows these preferences applying to all aspects of the alert. Section 309 relates to the treatment of names, while sections 312 and 315 relate to the treatment of numbers.

In section 309, the user can select which parts of a contact's name will be conveyed in an audible alert. The examples given here are first name, middle initial and last name, and combinations thereof. Other examples include title, suffix, nickname and so on. It may be specified that one or more parts of a name are only to be used if required to prevent two contacts from having the same alert, or to assure a minimum of maximum length to an alert. The order that these parts are presented may also be specified Section 312 is much like section 309 except that it pertains to portions of a phone number rather than a name. The examples given here are area code, prefix, suffix, but could also include country code, city code, every third digit, last five digits, hexadecimal representation, combinations thereof, and so forth and so on. Other choices could also be included such as the order of presentation, use only to prevent redundancy, and so forth and so on.

Section 315 allows a user to retain or alter the order in which the digits of a number are presented via an audible alert of certain embodiments. Example choices include, but are not limited to, original order, arbitrary and custom. The later two, may be applied uniformly to all communications in order to provide a form of encryption, privacy for the receiver and anonymity for the initiator of a communication. Examples of other choices include reverse order, and so on.

The examples given in FIG. 3 and associated text are for illustration purposes only. They are neither comprehensive, nor are any required. The concepts illustrated in section 315 could be applied to names, email addresses, or street address for example. An option designating an alert as a call waiting alert could be added to the user selection screen or screens, for example. Also, any section or sections could be omitted and replaced with some default setting.

In some embodiments, information can be conveyed through the basic character of the sound of the alert, while in other embodiments, information can be conveyed irrespective of the basic character of the sound of the alert. Section 318 pertains to the later. All sounds are comprised of one or more vibrations. These vibrations, their frequencies and amplitudes, both absolute and relative to each other, as well as changes in frequencies and their amplitude over time confer to each different sound its unique and recognizable (to the human ear) characteristics or basic character. Terminology commonly used to describe such sound characteristics includes, but is not limited to, timbre, which may comprise overtones (harmonics and partials), attack, decay, sustain, and release; tremolo; and vibrato. Different sound characteristics are imparted to the alert through the selection of the above parameters. Note that the only sounds that comprise only one frequency and exhibit none of the other qualities mentioned are simple sine waves of constant frequency and amplitude (although this could in itself be considered a unique timbre).

Embodiments that convey information irrespective of the basic character of the sound of the alert comprise sets of sounds that differ in their fundamental frequencies, or differ in the amplitudes of their fundamental frequencies. Other qualities remain largely unchanged relative to the fundamental frequencies.

Section 318 illustrates a few of the various sound qualities or basic characteristics that may be applied to the alerts. Depending on parameters or qualities such as those mentioned above, alerts may sound like conventional phone rings, musical instruments, birds, human voices, and so forth and so on. Techniques for producing or creating various sound qualities or basic characteristics include physical modeling, spectral modeling, sampling synthesis, and the like. These and other techniques are generally known with tools and reference materials to implement the techniques being readily available. The examples shown in the figure are phone ring sounds, sine waves, piano, viola, bird sounds, synthetic voice, arbitrary sounds, optimized sound set, custom, silly sounds, synthetic speech, and pig-Latin speech. The potential list of choices is vast. Additional options may include traffic sounds, drums, square waves, and so forth and so on.

Not all options need be involve predetermined sound qualities. For example, new sound files can be incorporated after a given electronic device is acquired by its user. Techniques such as spectral modeling, physical modeling, and sampling synthesis can be used to apply sound qualities or characteristics not available at the time a given electronic device is acquired by its user. For example, sounds frequencies, their amplitudes, both absolute and relative to each other, as well as changes in frequencies and their amplitude over time can be modeled after these same qualities in voices. Voices from which the sound qualities are derived could include the individual user of the device, those who initiate communications to the device, other people's voices, synthetic voices, voices or sounds of animals, and the like.

As just one example evolving deriving sound qualities from a voice of a person initiating a communication to a device, the alert would have an initial quality of a traditional phone ring. The first time the device was used in a conversation involving a new phone number or address, the voice of the person associated with that number would be analyzed. The next time an incoming communication was determined to be originating from that number or address, the device would adjust the timbre and cadence of the alert to resemble that of the voice analyzed during the previous communication. More specifically to this one example, the cadence of an alert can be derived from the average frequency in which glottal stops occur during the speech the person whose voice is being analyzed. This would impart a quickness to alerts for people who speak quickly, and a slowness to alerts for people who speak slowly. The vowel sound, long "e", and the nasal sound, "n", can be used to construe the actual ring sound. This can be accomplished using techniques such as physical modeling, spectral modeling, sampling synthesis, and the like. The identification and sampling of the above-mentioned speech components can be accomplished using software subroutines or functions used in speech-to-text, speech recognition programs, and other applications known to those skilled in such arts. The resulting alert from this example might have a cadence resembling that of the caller's speech, a basic sound quality similar to, and derived from the formant of the caller's pronunciation of the vowel sound, long "e" at the start of each sound pulse and the overtones exhibited in the caller's pronunciation of the nasal, "n", at the end of each sound pulse.

As stated above, embodiments that convey information irrespective of the basic character of the sound of the alert comprise sets of sounds that differ in their fundamental frequencies, or differ in the amplitudes of their fundamental frequencies. There are a vast number of ways that fundamental frequencies, or their amplitudes, can be varied in order to convey information. Each variant can be thought of as a different code. Section 321 illustrates some of the choices that a user can have regarding the assignment of such codes. The examples given in the figure are OPTIMIZED CODE, empirically determined to facilitate rapid learning for most people; SCRAMBLE, a unique code assigned to each user selecting this option; and CUSTOM, user assigned code. Other examples could include six fundamentals, ten fundamentals, symbol groupings, and so forth and so on.

The last section of FIG. 3, section 324, deals with cadence. The upper left choice in section 324 would result in audible alert sounds followed by a short pause, more audible alert sounds, a longer pause, audible alert sounds, a short pause, more audible alert sounds, a longer pause, and so forth and so on. The upper middle choice would result in audible alert sounds, a long pause, more audible alert sounds, a long pause, and so forth and so on. The upper middle choice would result in audible alert sounds, a short pause, more audible alert sounds, a short pause, and so forth and so on. The middle row provides for the same three choices as the upper row, except that the audible alert sounds are produced for a longer time and the pauses are also longer. In the lower left choice, the short pause is eliminated. In the middle bottom choice, both pauses are eliminated, and the lower right choice is the same except that the audible alert sounds are produced for a longer time. As with the other examples, this list is not intended to be comprehensive.

Although not shown, it is possible to provide the feature where the order that information is audibly presented is user selectable. For example, one user may prefer to have the alert identify the initiator then the receiver then the initiator then the receiver and so forth. A different user may prefer to have the alert identify the receiver then the initiator then the initiator then the initiator and so forth.

As stated in the description of FIG. 2A, the audible alert comprises sets of sounds or acoustic symbols which may be derived from and assigned to phonemes, letters, numbers, or other types of characters used to represent information pertaining to the receiver, initiator, contact, or communication type. It is possible to shuffle or randomize the correspondence of acoustic symbols to phonemes, letters, numbers, or other types of characters, and to assign to a device such as a telephone, PDA, computer, etc. a unique correspondence of the acoustic symbols to the characters. The result is a form of weak encryption. The owner or user of a device, with a given correspondence of the acoustic symbols to the characters, will become accustomed to the sounds of their device and therefore be able to perceive the information carried in its audible alerts. However, someone else whose device uses a different correspondence of the acoustic symbols to the characters will be unaccustomed to the sounds of another's device and therefore unable to perceive the information carried in its audible alerts. The resulting (optional) privacy for the receiver and anonymity for the initiator will be appealing to some users. In the example of FIG. 3, selecting SCRAMBLE from the choices given in section 321 would activate the encryption feature described above. Unique correspondences could be installed into devices at the time of manufacture, distributed electronically, derived from phone numbers, serial numbers, and so forth.

An example of a different form of weak encryption is to shuffle the digits of a phone number. Again, different devices would use different correspondences, this time from original digit order to final digit order. In the example of FIG. 3, selecting ARBITRARY DIGIT ORDER from the choices shown in section 315 would activate the encryption feature described above. Other encryption schemes are contemplated.

Certain embodiments may have factory default settings that enable substantial utility without requiring user input or programming. The options shown as checked in FIG. 3 illustrate one possible set of such default settings that may be used if the device is a telephone. The settings selected in the example would result in an alert sounding substantially like a conventional phone ring, as selected in section 318, while still being unique to the device, as selected in sections 303, 321. Also, the alerts would be unique to each caller's phone number, as selected in sections 306, 302, and therefore access to an up-to-date contacts list or electronic address book would not be required. This is advantageous, as often newly purchased phones have not been programmed with contact lists or electronic address books. The information would be conveyed to the owner or user of the device while being generally unintelligible to others, as selected in section 321.

FIG. 3 is for illustration purposes, and is not intended to represent an actual user interface preference menu. Information conveyed via certain embodiments is not limited to the receiver, the initiator, the type of communication, and type of contact. Other types of information are contemplated including, but not limited to, priority, urgency, importance, subject, weather alerts, stock movements, reminders, proximity alerts, and so forth.

FIGS. 4A, 4B, 4C, and 4D illustrate a few examples of an audible alert as might result at the end state 232 (FIG. 2A). These figures also illustrate how various sound qualities including, but not limited to, timbre, which may comprise overtones (harmonics and partials), attack, decay, sustain, release; tremolo; and vibrato can be used according to some embodiments. Various other patterns, sounds, combinations and so forth are contemplated.

Along the top of each FIGS. 4A, 4B, 4C, and 4D, the words within the starburst outlines indicate the sound characteristics of the alert as may have been assigned in a preference selection in section 318 (FIG. 3). Grouping and spacing portray cadence as may have been assigned in a preference selection in section 321 (FIG. 3) for example. The boxes portray a type of information presented within each portion of the alert as may have been assigned in a preference selection in section 303, while the words in quotes below each box portray the actual information content according to a preference selection as indicated in sections 306, 309, and 312.

Variations in sound qualities including, but not limited to, timbre (including overtones, attack, decay, sustain, release), tremolo, and vibrato result in alerts having sounds which are distinctly recognizable, resembling such things as ringing, chirping, buzzing, various musical instruments, and so forth. The characteristic qualities of these distinctly recognizable sounds are substantially independent of the fundamental sound frequencies comprising the alert. These factors in combination with temporal variables such as the sequential arrangement of the components of the alert, and cadence (comprising the duration of each component and time gaps, if any, between them), give rise to the overall general sound of the alert. Examples include, "ringing ringing pause ringing ringing pause, and so forth" as in FIG. 4A, and "buzzing pause buzzing pause, and so forth", as in FIG. 4B.

The informative aspect of the alert which is applied by the process 220 (FIG. 2A) in accordance with preferences 210 exemplified in (FIG. 3) may consist of variations in the fundamental sound frequencies of the alert. At any given time, the alert may comprise one or more fundamental sound frequencies. Each of the rectangular boxes shown in FIGS. 4A, 4B, 4C, and 4D represent a series of acoustic symbols, the acoustic symbols each comprising one or more fundamental sound frequencies. The words in quotes below the boxes represent the actual information corresponding to the unique sequence of acoustic symbols.

Figure 4A:
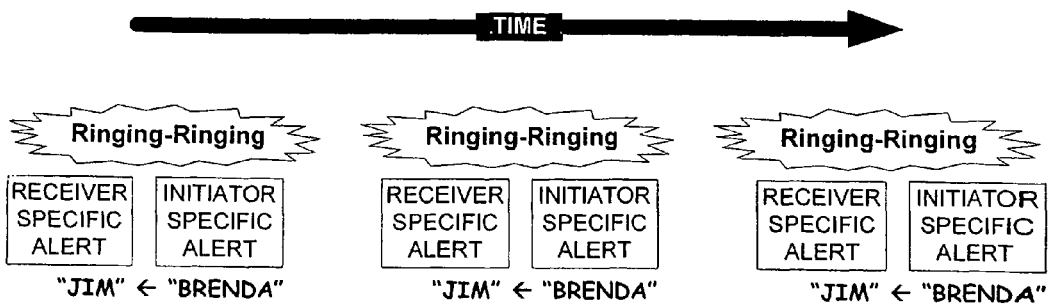
FIGS. 4A, 4B, 4C and 4D are diagrams illustrating exemplary audible alerts such as produced at the completion of process 230 shown in FIG. 2A.
Figure 4B:
Figure 4C:
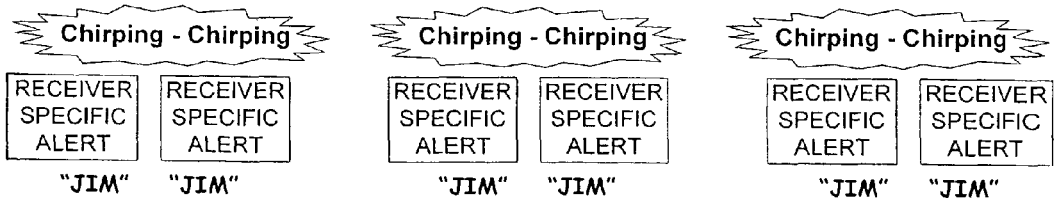
Figure 4D:

In FIG. 4A, the alert has the timbre and tremolo of a conventional phone ring and a temporal arrangement such that the resulting alert sounds like "ringing ringing pause ringing ringing pause, and so forth". The informative component of the alert, "for Jim from Brenda" is conveyed via modulating the sound frequency of the ringing. The first ringing of each "ringing ringing pause" conveys the word "Jim". The second ringing of each "ringing ringing pause" conveys the word "Brenda". In FIG. 4B, the alert has the timbre and vibrato of a buzzing sound and a temporal arrangement such that the resulting alert sounds like "buzzing buzzing pause buzzing buzzing pause, and so forth", and the information conveyed via frequency modulation is "for Jim from Brenda". In FIG. 4C, the alert sounds like "chirping chirping pause chirping chirping pause, and so forth", and the information conveyed via frequency modulation is "for Jim". In FIG. 4D, the alert sounds like "ringing pause ringing pause ringing pause, and so forth", and the information conveyed is "from Brenda".

FIGS. 4A, 4B, 4C, and 4D illustrate that different preference settings can independently control how the alert sounds and what information will be conveyed. These figures also illustrate how using frequency modulation to confer information to the user need not drastically alter the basic sound of the alert.

In FIGS. 4A and 4B, neither the nature of sounds, ringing vs. buzzing, nor the cadence variations affect the information content of the alert. However, the information embedded in the alert will result in a perceivable modulation of at least some characteristics of the basic alert sound. It is this last aspect that causes each alert to be unique and recognizable.

FIGS. 4A and 4C are different in that frequency modulation conveys only the identity of the recipient or initiator, respectively. Here the other qualities such as cadence, timbre, tremolo, and/or vibrato, and so forth, for example, might be used to convey the identity of the initiator or the recipient, respectively.

Some embodiments may convey information not limited to the identity of the receiver, and/or the initiator. Some embodiments may convey information not comprising the identity of the receiver, and/or the initiator.

Figure 5:
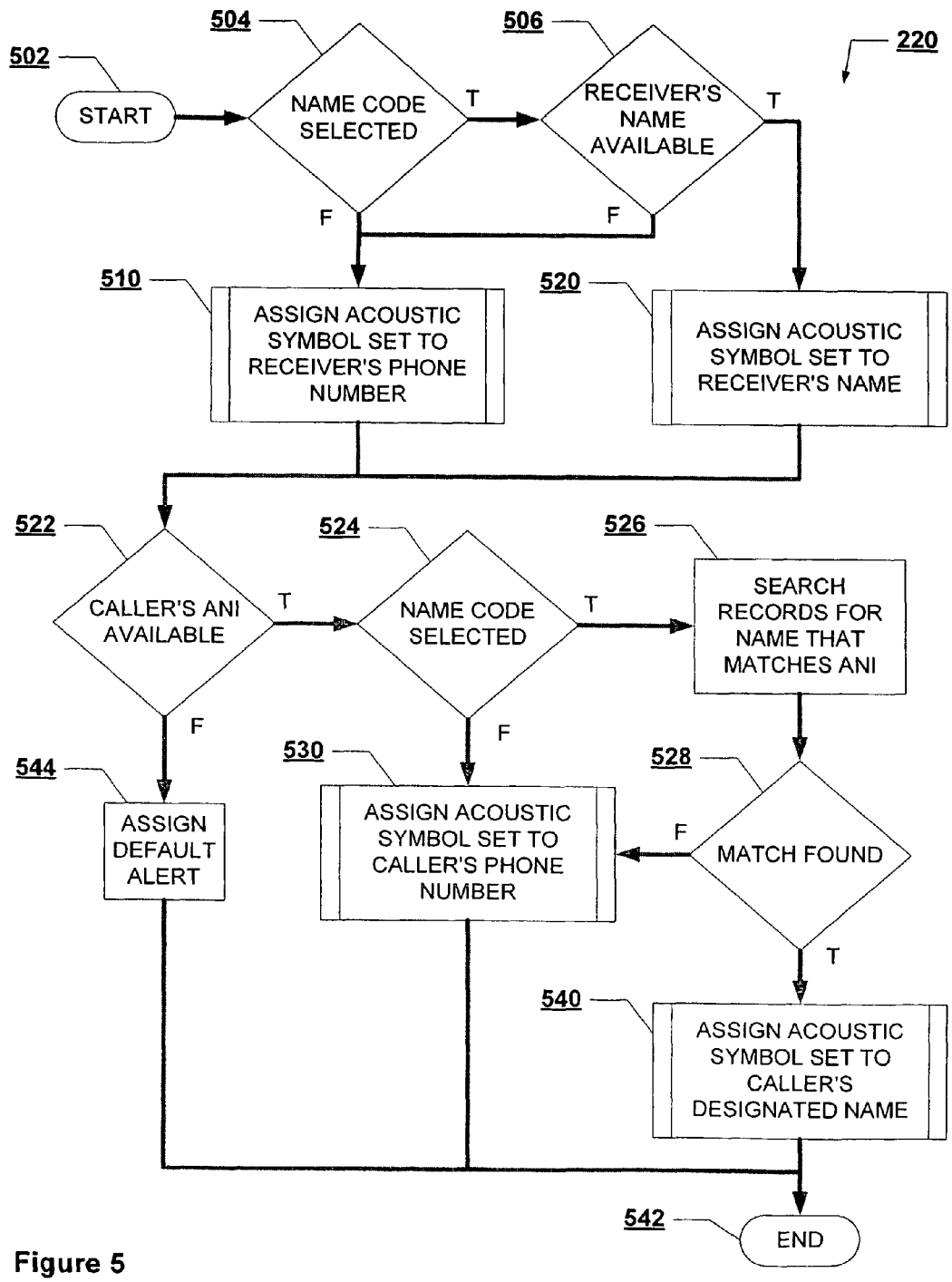
FIG. 5 is a flow diagram of an exemplary process for assigning specific alerts to a device such as performed by process 220 shown in FIG. 2A.

FIG. 5 illustrates a possible telephonic application embodiment and expands upon the process 220 (FIG. 2A). Depending on the embodiment, additional states and/or processes may be added, others removed, and the ordering of the states and processes rearranged. Here, depending on user preference settings 210 (FIGS. 2 and 3), a distinctive alert is derived from and assigned to the name associated with the device, and the name of the contact associated with a phone number derived from the ANI (or other type of identifier) of the incoming call at a process 520, and a process 540, respectively. However, if it is determined at a decision state 504 that the "name code" feature has not been selected (or it has been deselected), or if at a decision state 506 a name associated with the device is unavailable, the receiver indicative alert will be derived from and assigned to the phone number associated with the device at a process 510. If it is determined at a decision state 524 that the "name code" feature has not been selected (or it has been deselected), or if it is determined at a decision state 528 that no contact name is associated with a phone number derived from the ANI (or other type of identifier) of the incoming call, the initiator indicative alert will be derived from and assigned to the phone number derived from the ANI (or other type of identifier) at a process 530. If it is determined at decision state 522 that no ANI (or other type of identifier) is available or accessible, a default alert is assigned as the initiator indicative alert at a state 544.

The processes 510, 520, 530, and 540 (FIG. 5) may assign sets of acoustic symbols to names, words, or numbers by different methods. One exemplary method involves assigning a different acoustic symbol to each member of the character set used to represent the names, words, or numbers. In one embodiment, an option is provided at section 306 (FIG. 3) for the acoustic symbol assignment to be based upon the spelling of the word or name or its constituent phonemes. The acoustic symbols are than substituted for the characters comprising the names, words, or numbers.

Figure 6A:
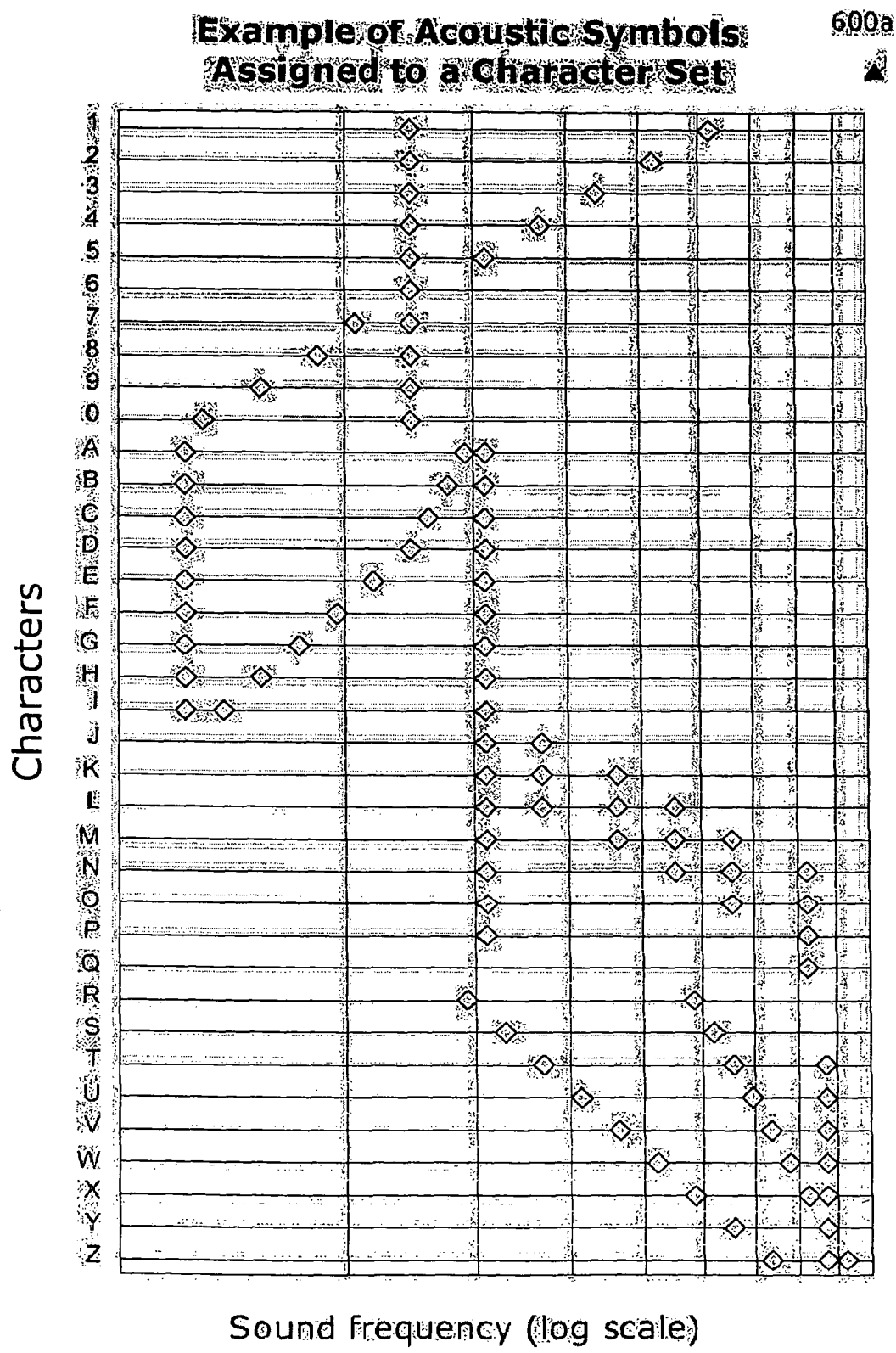
FIG. 6A is a diagram of an exemplary assignment of acoustic symbols to a character set such as used by the processes shown in FIG. 5.

FIG. 6A relates to the processes 510, 520, 530, and 540 and provides one example of how acoustic symbols may be assigned to a character set of a type often used to represent names, numbers, and other receiver and initiator specific information. This graphical representation 600A shows how unique combinations of sounds (and in special cases, single sounds) can be assigned to each character in the set. The range of sounds used in this example span approximately one log in frequency, the actual upper and lower limits being arbitrary (hence no unit label for frequency). Fundamental frequencies ranging from 100 Hz to 6 kHz may be particularly useful in telephonic applications. The range of frequencies used is also arbitrary but needs to be sufficient to allow distinct frequency intervals and/or combinations of intervals. In this example, each character is assigned a frequency and one or more frequency intervals at which additional sounds are produced (and in special cases, a frequency only). The intervals (and in special cases, their absence) can be distinguishing characteristics of each of the acoustic symbols. In the special cases were the interval is lacking (or unity) within an acoustic symbol, as in "6" and "q", and in cases were two symbols have the same interval as in "9" and "Y", the frequency intervals between the symbols is an additional distinguishing characteristic.

For any given sound frequency, the qualities of the sounds used may include and differ in timbre, including overtones, attack, decay, sustain, release; tremolo; vibrato; and other parameters. In most instances, the frequency of a sound is considered to be its fundamental or lowest frequency component.

The use of intervals may have advantages as most people, including trained musicians, lack the ability to recognize individual sound frequency but are able to recognize intervals. Another potential advantage can be a softening of the sound of the resulting audible alert. This, however, does not preclude the assignment of single sound frequencies in certain embodiments, particularly when such sounds are themselves separated by frequency intervals.

FIG. 6B illustrates that in some embodiments the relationship between sound frequencies rather that the sound frequencies themselves are important. The figure is a tabular representation 600b of the same example illustrated by the chart 600a (FIG. 6A). The INTERVALS section 605b lists the intervals that are graphically represented in the chart 600a as a ratio of the sounds comprising a given acoustic symbol to the lowest frequency sound comprising the same acoustic symbol. The FUNDAMENTALS section 615b lists sound frequencies consistent with both the INTERVALS section 605b as well as the chart 600a (FIG. 6A). The ALTERNATIVE FUNDAMENTALS section 625b also lists sound frequencies consistent with both the INTERVALS section 605b as well as the chart 600a (FIG. 6A). Although the FUNDAMENTALS section 615b and the ALTERNATIVE FUNDAMENTALS section 625b share no frequencies in common, they represent the same set of acoustic symbols, and are not substantially different, further illustrating the significance of the relationship between sound frequencies (both within and between acoustic symbols) rather that the sound frequencies themselves.

Although the example shown in FIGS. 6A and 6B deals with assigning sounds to letters and numbers, the underlying principles can be applied to different kinds of sounds and characters and symbols.

Figure 7:
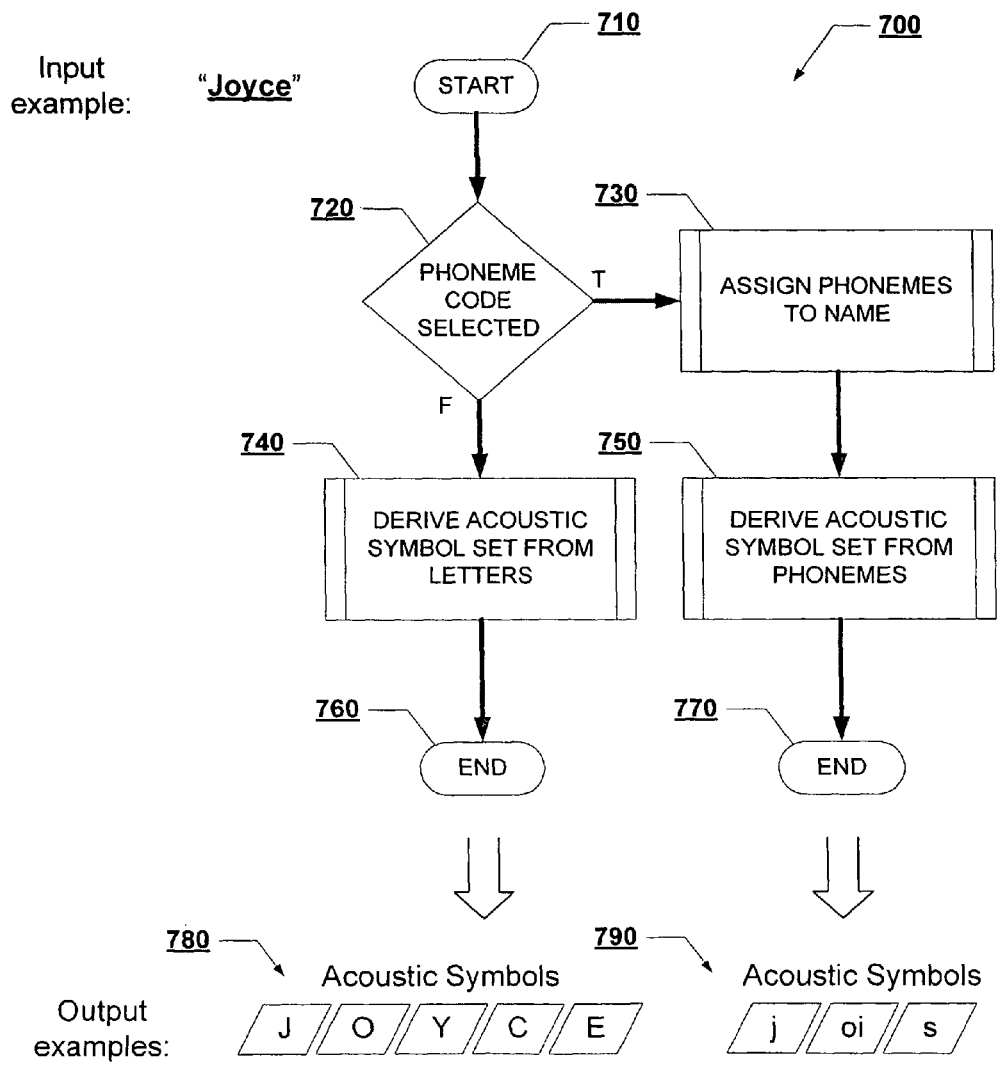
FIG. 7 is a flow diagram of an exemplary process for deriving an acoustic symbol set from a name or word such performed by process 520 or process 540 shown in FIG. 5.

FIG. 7 illustrates a process 700 that expands on the processes 520 and 540 (FIG. 5) showing two different ways that a set of acoustic symbols (sounds) can be derived from and assigned to a name or a word by assigning individual acoustic symbols to the constituent parts of the name or word. Depending on the embodiment, additional states and/or processes may be added, others removed, and the ordering of the states and processes rearranged. At a start state 710, "Joyce" is an example of a name to which a set of acoustic symbols will be assigned. At a decision state 720 a determination is made whether the preferences, as determined at section 306 (FIG. 3) of process 210, call for acoustic symbol assignment to be based upon the spelling of the word or alternatively its constituent phonemes. If the acoustic symbols are to be assigned based upon spelling, an acoustic symbol is assigned to each letter comprising the word by a process 740. This will result, at an end state 760, in a set of five acoustic symbols 780 each representing one of the letters in the word "Joyce". If the acoustic symbols are to be assigned based upon phonic structure, a set of phonemes are assigned to the word by a process 730, and an acoustic symbol is assigned to each phoneme by a process 750. This will result, at an end state 770, in a set of three acoustic symbols 790, each representing one of the phonemes in the word "Joyce". These examples are not intended to limit this description as other approaches are readily contemplated.

An advantage in deriving sets of acoustic symbols from phonemes is that the resulting alerts tend to be shorter for many languages. Another advantage in deriving sets of acoustic symbols from phonemes is that the user will begin to associate the sounds of the alerts with the sounds of words or people's names.

FIG. 8 is a list of English phonemes as may be employed by the process 730 (FIG. 7). This list cross-references three equivalent phonic alphabets. Other languages can be represented by similar tables. Phonemes can be assigned to words, including names, by software subroutines or functions used in text-to-speech programs and other applications known to those skilled in such arts.

Moments of relative silence that occur in natural speech, although not generally classified as phonemes, can be considered to be like phonemes in certain embodiments of the invention. Examples include glottal stops, pauses between words and syllables, or between the suffix and prefix of a phone number.

The number of different transformations giving rise to a set of acoustic symbols is infinite (hence numerous encryption possibilities). Transformations giving rise to a correspondence between an acoustic symbol set and some other symbol set can take many forms. It may be desirable that one or more of the acoustic symbols have a bimodal or polymodal distribution of energy as a function of frequency, so that members of such a set will be more easily recognizable by the human ear. Moreover, the number of acoustic symbols, distinct to the human ear that can be created within any given range of sound frequencies, is greater if one or more of the symbols has a bimodal or polymodal distribution of energy as a function of frequency.

Acoustic symbols can be created such that their distinguishing characteristics are substantially independent of frequency, timbre, tremolo and other sound qualities. For example, each of the acoustic symbols within a set could produce as a high pitched ring or cat's meow, or as a low pitched buzz or cow's moo without changing their meanings or becoming unrecognizable to the listener. (This is not to say timbre and other qualities couldn't also be used to convey meaning.) In one embodiment, to preserve the meaning and recognizable qualities of the acoustic symbols of the current example, two characteristics of the set and its symbols should remain substantially unchanged. First, the intervals between the most dominant (loudest) frequencies within each acoustic symbol should be substantially preserved. Second, the intervals between the most dominant (loudest) frequencies between each acoustic symbol should be substantially preserved. For the purposes of this discussion, an interval is the difference of the log values of two frequencies.

Transforming a set of symbols into a set of acoustic symbols, such as by the transformation process 252 or 272 (FIG. 2B), can be accomplished in a variety of ways. For example, one might employ a table 600a, 600b (FIGS. 6A and 6B) to map a correspondence from the domain set of symbols such as a digital character set to a range set of acoustic symbols. Alternatively, a set of rules or a transforming equation can be used. Combinations of these and other tools can also be employed. One example of an approach combining the use of a transforming equation and a table follows.

First, an equation, f(n), is used to transform the set of integers, N={ ... −2, −1, 0, 1, 2, ... } into a set of frequencies, F={ ... , f(−1), f(0), f(2), ... }, such that within any finite frequency interval, H (e.g., the range of human hearing), there exists a finite set of discrete frequencies S=F∩H. Next, an acoustic symbol set is created by correlating the members of a symbol set (e.g., numbers, letters, or phonemes) to individual frequencies within the set of available frequencies, S.

Because human hearing is receptive to sound frequency changes in a logarithmic fashion, it may be desirable to construct the equation, f(n), such that f(i)/f(i+1)=f(j)/f(j+1) for all integers, i and j. An example of such an equation is $f(n)=x*v^{(n/p)}$, where x, v, and p are real numbers greater than one. For illustration purposes, if x=2, v=10, and p=2, and H=[20 Hz, 20 kHz], the range of human hearing, the available frequencies, S=F∩H would be the set {20 Hz, 63 Hz, 200 Hz, 632 Hz, 2 kHz, 6.3 kHz, 20 kHz}, corresponding to n values of {2, 3, 4, 5, 6, 7, 8}.

It may be noted that values for v that are powers of 2 such as 2, 4, 8, etc. and values for p such as 3, 4, 6, 12, and 24 will tend to give rise to frequencies separated by intervals approximating naturally occurring overtones. Such sets of frequencies may give rise to sets of acoustic symbols that are more pleasing and perhaps more discernable to the ear.

Table 900 (FIG. 9) illustrates how this technique can be used to assign combinations of sounds (and in special cases, single sounds) to each character of a set representing English phonemes. The values used in the equation f(n) are x=500, v=2, and p=12, and the frequency interval is H=[150 Hz, 1500 Hz]. In this example, most characters are assigned one or more frequencies portrayed by their corresponding n value. In three cases, "AE", "UW" and "UH", where single fundamental frequencies have been assigned, the lack of an interval is unique and discerning. Another aspect of this example is that three sets of three sounds: {−17, −13, −10}, {−3, 0, 4}, and {8, 13, 18} (nine sounds in all) are established (for clarity only, in this example each set comprises three frequencies within one factor of 2, and the sets do not overlap). In this example, each phoneme is represented by up to three sounds, no more than one from each set. The advantage here being that the resulting acoustic symbols are simple, distinctive, and easy to recognize. A potential advantage in having a small set of sounds (nine in this example) to derive the acoustic symbols from is that the individual sounds will be more distinctive sounding to the human ear than if they are elements of larger sets. Also, in certain embodiments where the different sounds differ in their fundamental frequency, but have other characteristics in common, smaller sets of sounds can be placed into smaller frequency intervals, H. Note, that in this example, if the value of x is increased or decreased, the frequencies associated with each acoustic symbol will increase or decrease respectively. Changing all of the acoustic symbols uniformly in this way may alter how they sound, but it need not substantially alter the information content or recognizable aspects of the alert.

As further shown in the example table 900, each phoneme is assigned a duration in milliseconds. In one embodiment, the sounds are produced for longer periods of time if they correspond to phonemes that are relatively long in duration in natural speech.

Figure 10:
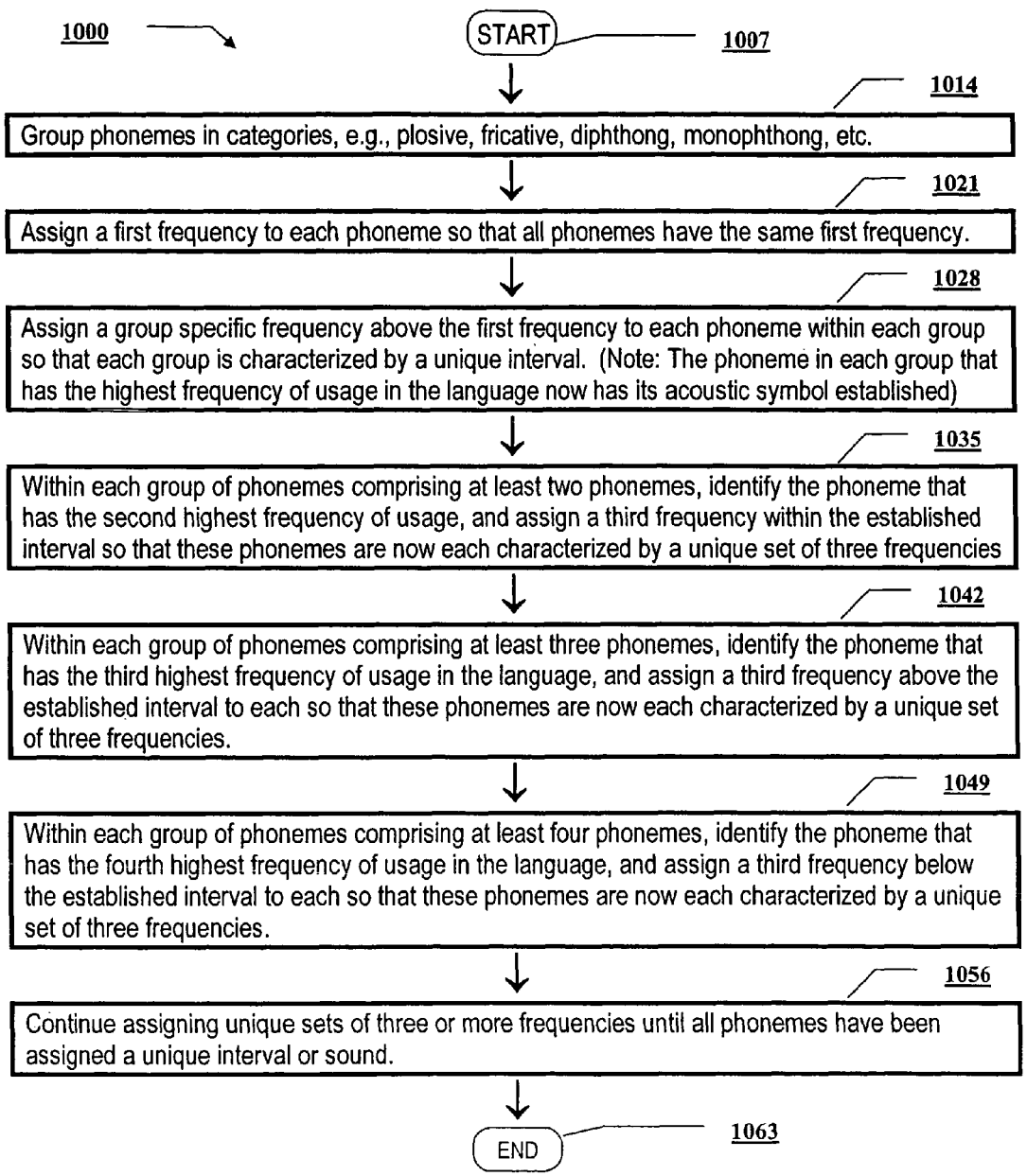
FIG. 10 is a flow diagram of an exemplary process for assigning acoustic symbols to phonemes, the result of which can be used by process 750 shown in FIG. 7.

FIG. 10 shows an example of portions of an algorithm or process 1000 for assigning acoustic symbols to phonemes. Depending on the embodiment, additional states and/or processes may be added, others removed, and the ordering of the states and processes rearranged. After such an assignment has been performed once, the resulting correspondence can be used and reused by the process 750 (FIG. 7) in its assignment of sets of acoustic symbols to words and names. Beginning at a start state 1007, the phonemes of a given language are placed into groups of like phonemes (e.g., plosive, fricative, diphthong, monophthong, etc.) by a process 1014. Such a placement of phonemes into groups of like phonemes is known to linguists and others skilled in such arts. In one embodiment, all phonemes are then assigned a sound frequency (the root) by a process 1021, all phonemes being given the same root. Processes 1028, 1035, 1042, 1049, and 1056 then assign additional sound frequencies to each phoneme creating unique intervals and sets of intervals for each. Note that after all phonemes have been assigned a second sound frequency by the process 1028, the most frequently used phonemes of each group are not assigned additional sound frequencies. Therefore these phonemes are represented by simple single intervals.

The large number of different attainable outcomes at an end state 1063 allows for a high degree of device to device variability in the resulting assignment of acoustic symbols to phonemes. The result is that it will be difficult or impossible for people to perceive the information content of audible alerts from devices or accounts not used frequently by them (e.g., other people's devices or accounts, in particular). The resulting (optional) privacy for the receiver and anonymity for the initiator will be appealing to some users. Also, in this example, the most commonly occurring phonemes are assigned some of the simpler sounding and recognizable symbols. This results in a less complex and more distinctive alert. This aspect also enhances the user's ability to learn to recognize the acoustic symbols associated with the phonemes of a given language.

Figure 11:
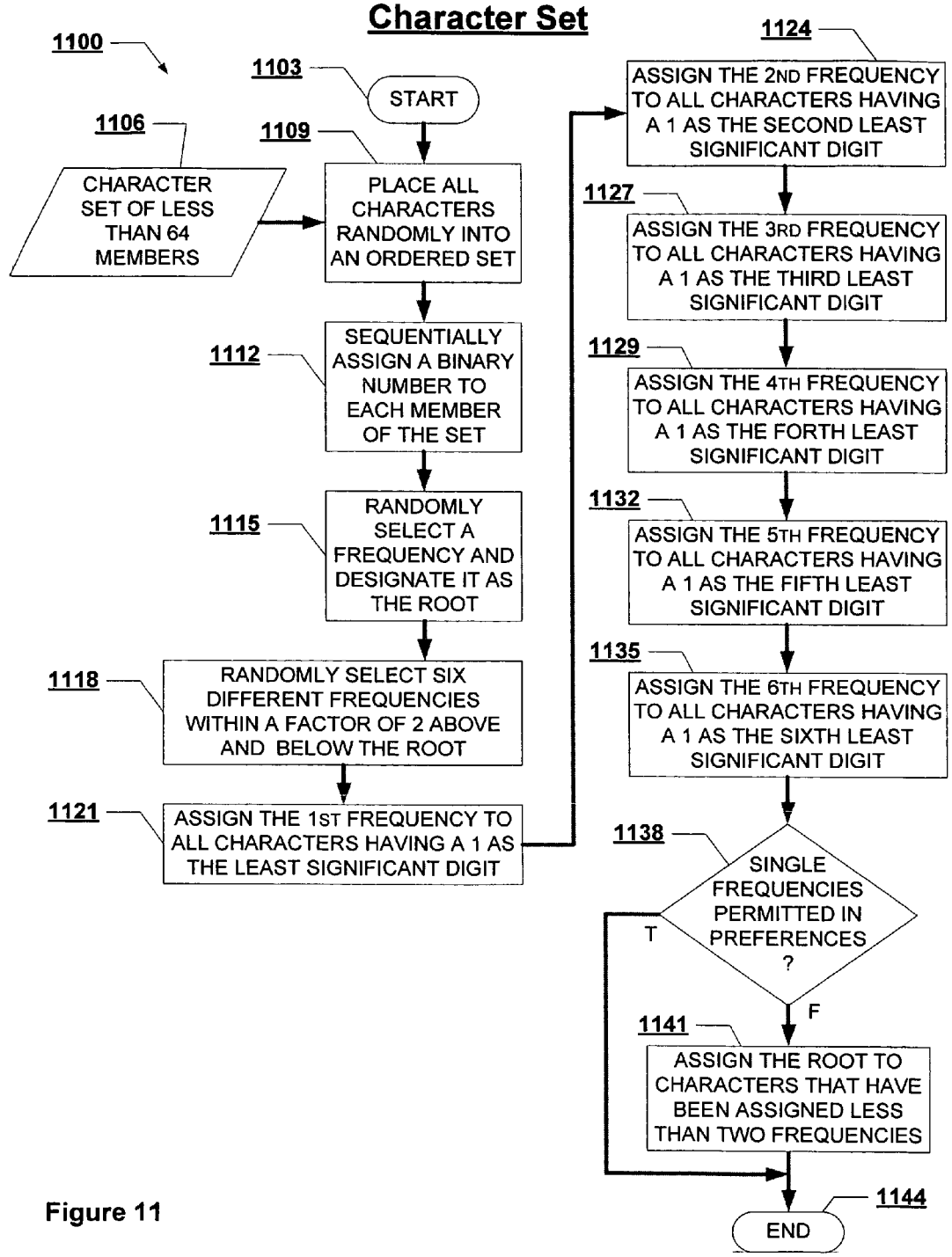
FIG. 11 is a flow diagram of an exemplary process for assigning acoustic symbols to members of a symbol set, the result of which can be used by process 510 or process 530 shown in FIG. 5, or process 740 or process 750 shown in FIG. 7.

FIG. 11 illustrates an example of an algorithm or process 1100 for assigning acoustic symbols to the members of a symbol set, such as the letters of an alphabet and the digits of a counting system, or the phonemes of a language. Depending on the embodiment, additional states and/or processes may be added, others removed, and the ordering of the states and processes rearranged. After such an assignment has been performed once, the resulting correspondence can be used and reused by the process 510 (FIG. 5), the process 530, the process 740 (FIG. 7), or the process 750 in its assignment of sets of acoustic symbols to words, names, or numbers. Here, the members of a character set 1106 are randomly arranged into an ordered set by a state 1109, and then assigned sequential binary numbers by a state 1112. Seven sound frequencies are then selected by states 1115 and 1118. One or more of these are then assigned to each member of the character set by states 1121, 1124, 1127, 1129, 1132, and 1135. If it is determined at a decision state 1138 that preferences forbid the assignment of acoustic symbols comprising just a single fundamental frequency, a state 1141 then assigns the root to all members of the character set that have not already been assigned more than one note.

The example shown in FIG. 11 is for character sets of less than 64 members, but it would be straightforward to create algorithms to treat larger sets. The extremely large number of different attainable outcomes at an end state 1144 allows for an extremely high degree of device to device variability in the resulting assignment of acoustic symbols to characters. High device to device variability will result in it being difficult or impossible for people to perceive the information content of audible alerts from devices or accounts not used frequently by them (e.g., other people's devices or accounts). The resulting (optional) privacy for the receiver, and anonymity for the initiator, will be appealing to some users.

For example, in a setting where several people each possess the same model of mobile phone, and one person's phone rings, that person will know that is their phone as well as who is trying to reach them. The others will know only that is not their phone that is ringing.

In a different, somewhat extreme example where the selection of sounds is limited to six sound frequencies and the character set is limited to the 26 letters in the English alphabet, there would still be over $1.44 \times 10^{44}$ (one point four times ten to the forty-fourth power) unique outcomes or personal codes. A potential advantage in having a small set of sounds (six in this example) to derive the acoustic symbols from is that the individual sounds will be more distinctive sounding to the human ear than if they are elements of larger sets. Also, in certain embodiments where the different sounds differ in their fundamental frequency, but have other characteristics in common, smaller sets of sounds can be placed into smaller frequency intervals.

Figure 12A:
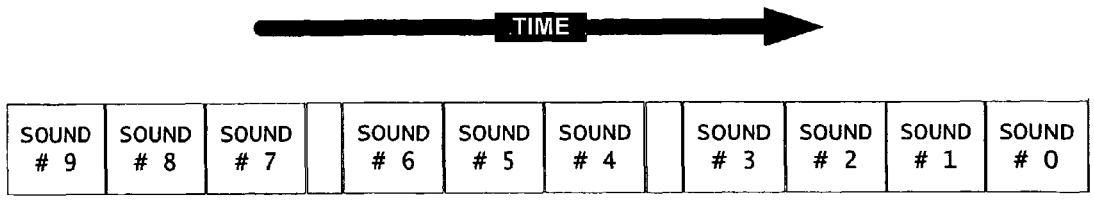
FIGS. 12A-12H are diagrams that illustrate ways that acoustic symbols assigned to digits in a counting system, such as by process 510 or process 530 shown in FIG. 5, can be arranged into an audible alert.
Figure 12B:
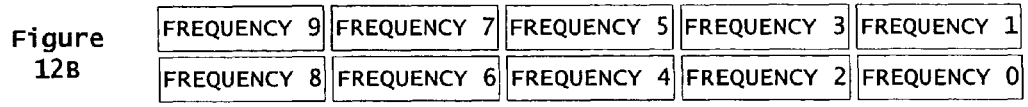
Figure 12C:
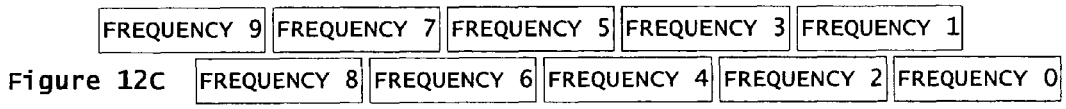
Figure 12D:
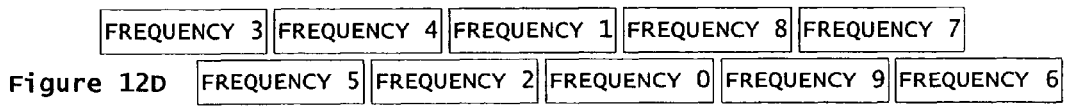
Figure 12E:
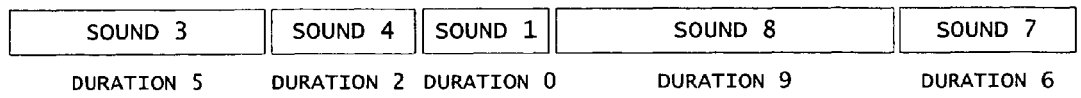
Figure 12F:
Figure 12G:
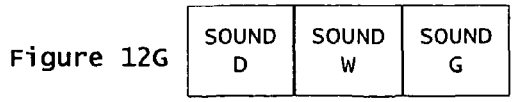
Figure 12H:

FIGS. 12A-12H relate to the processes 510 and 530 (FIG. 5) and illustrates some of the ways that acoustic symbols assigned to digits of a counting system can be arranged into an audible alert as in certain embodiments. All eight of the given examples illustrate an audible alert derived from an exemplary telephone number 987-654-3210. The first example, shown in FIG. 12A, is a direct translation of the ten-digit number into ten sequential unique polyphonic (polymodal with respect to energy as a function of frequency) sounds, each sound representing a unique digit. In the next two examples, shown in FIGS. 12B and 12C, single monophonic (one fundamental sound frequency) sounds can be assigned to digits, as the final arrangement results in the creation of distinctive intervals. Note that in FIG. 12C, but not in FIG. 12B, a unique alert is assured for all possible 10-digit numbers. The example shown in FIG. 12D differs from 12A, 12B, and 12C in that the order of the digits is shuffled. In the fifth example, shown in FIG. 12E, the digits have been grouped into ordered pairs. The first member of each digit pair is assigned a sound, and second member is assigned a duration for that sound. In one embodiment, the duration corresponds to the value of the digit, except when the digit is zero, when a predetermined minimum duration is assigned. In the sixth example, shown in FIG. 12F, only four digits of the ten-digit number are assigned sounds. In one embodiment, these are the last four digits. This results in a shorter, simpler alert with the potential drawback that not all phone numbers can be assigned unique alerts. FIG. 12G, illustrates a completely random and arbitrary assignment and arrangement of sounds that are permanently assigned to each new phone number or contact name as it becomes available to the device. Of course, an alert first assigned to a phone number derived from the ANI (or other type of identifier) of an incoming call could be transferred to a contact name associated with that phone number at a later time. For the last example, shown in FIG. 12H, the phone number itself is assigned an acoustic symbol. As is apparent from earlier examples, the number of potential acoustic symbols is very large. It is therefore possible to assign a different single acoustic symbol to each new phone number or contact name as it becomes available to the device.

FIGS. 12A-12H and the examples they illustrates relate to the treatment of acoustic symbols assigned to digits as may be employed by the processes 510 and 530 (FIG. 5). However, the basic principles illustrated apply to letters, phonemes, and other symbols. Therefore the concepts illustrated here can also be applied to the processes 520 and 540, and the process 740 and 750 (FIG. 7).

FIGS. 13A-13D illustrate a few examples of how the acoustic symbol representation 790 (FIG. 7) for the word Joyce might appear at the end state 770 (FIG. 7) if the correspondence called for by table 900 (FIG. 9) were used in the process 750 (FIG. 7). Of course, other names or words and other values in table 900 will yield different results. In these examples, FIG. 7 relates to the process 520, or 540 (FIG. 5). Also, the NAME (PHONIC) option is selected in section 306 (FIG. 3).

FIGS. 13A-13D each represent examples of a 320 millisecond segment of sound during an audible alert of certain embodiments. These figures are simplified spectrograms with time in milliseconds along the bottom horizontal axis and sound frequency along right vertical axis. The frequency scale is logarithmic. On the left vertical axis are n values from the example equation used to create table 900 (FIG. 9), and on the upper horizontal axis are the phonemes being represented. The dark shapes represent sound frequency (vertical position) and energy (height or thickness) as a function of time.

Figure 13A:
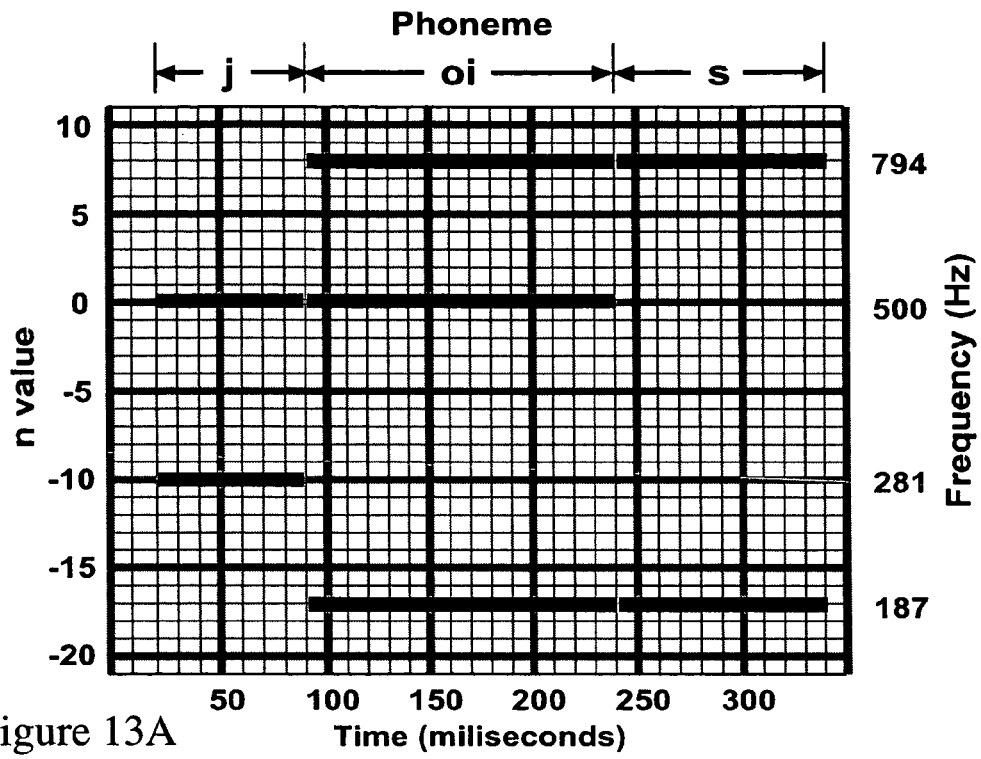
FIGS. 13A-13D are exemplary graphs of an acoustic symbol representation for an exemplary word corresponding to the completion of process 750 shown in FIG. 7.
Figure 13B:
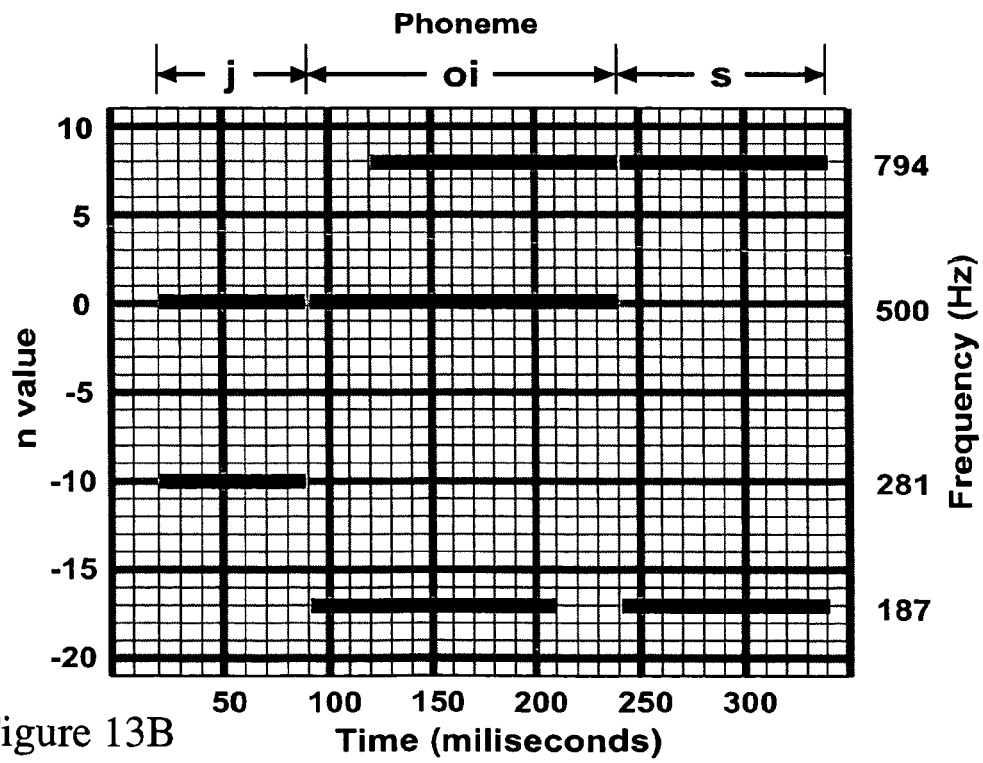
Figure 13C:
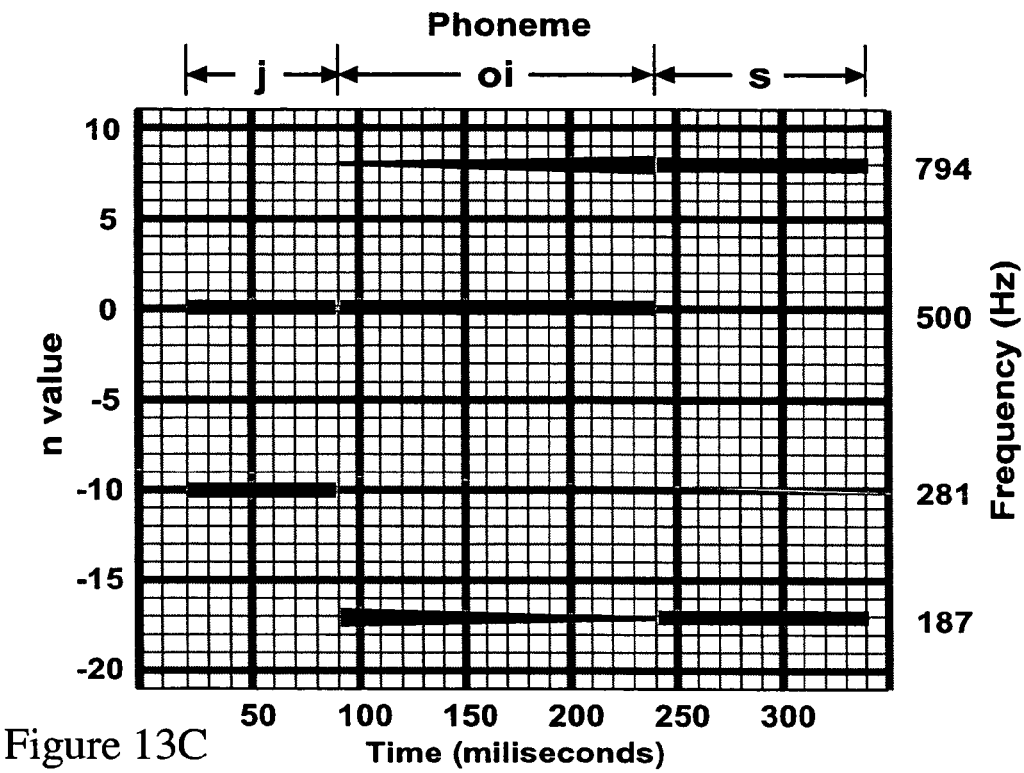

FIGS. 13A-13C each show energy at four discreet frequencies, 794 Hz, 500 Hz, 281 Hz, and 187 Hz. Therefore these figures can correspond to the selection of SINE WAVE in the section 318 (FIG. 3). Other sounds would generally exhibit overtones and transients. FIG. 13A is a simple example in that each acoustic symbol remains unchanged from beginning to end.

In FIGS. 13B and 13C, the phoneme "oi" exhibits a shift in emphasis from low to high frequency during its 150 milliseconds of play. In FIG. 13B, this is accomplished by delaying the start of its 794 Hz component by 30 milliseconds and ending its 187 Hz component 30 milliseconds early. In FIG. 13C, the 794 Hz component increases in intensity over time, while the 187 Hz component decreases over time.

Figure 13D:
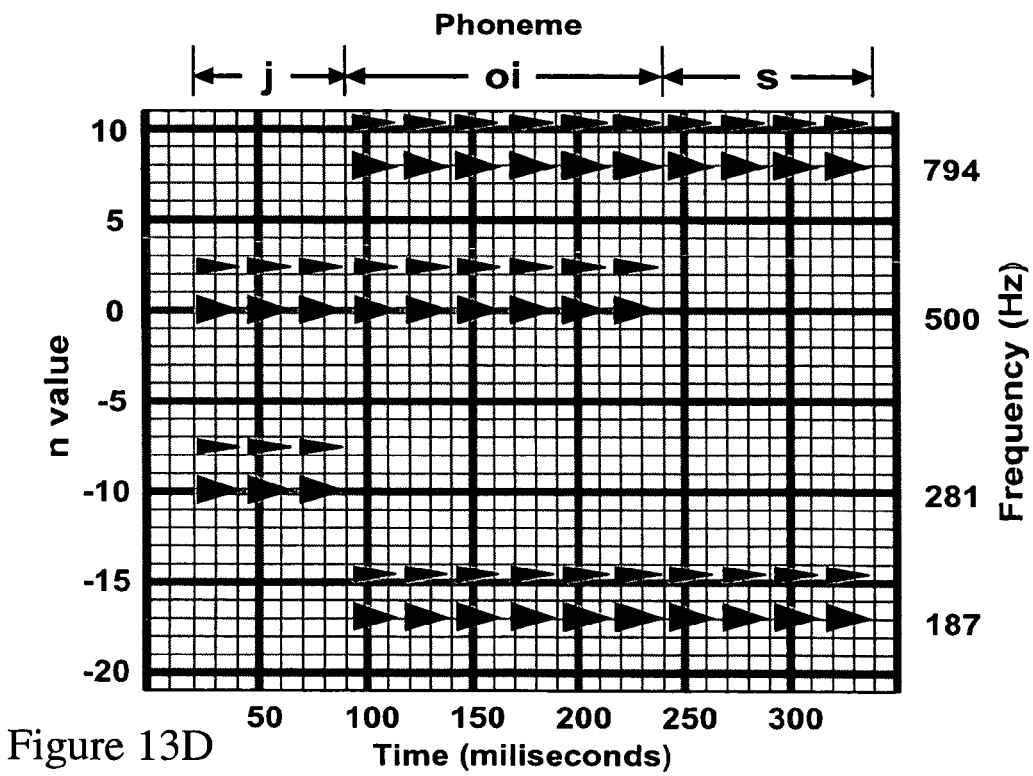

FIG. 13D illustrates an alert that has a low-pitched sound somewhat like a combination between a ringer and a buzzer. This quality results from abruptly increasing and quickly decreasing the energy (intensity) of all frequencies in unison about every 20 milliseconds. Overtones are also present, represented as less intense higher frequency images of the fundamentals. To aid in visualizing this example, the overtones have been placed closer to the fundamentals than they would actually occur.

Frequency intervals have been used to describe how embodiments of acoustic symbols and audible alerts are created. Those knowledgeable in matters relating to human hearing will realize that some intervals and sets of intervals are easier to recognize than others. Also some intervals and sets of intervals have a more pleasing sound than others. The same applies for other sound qualities including but not limited to timbre, comprising overtones (harmonics and partials), attack, decay, sustain, release; tremolo; and vibrato. These and other factors would be taken into account by those practicing embodiments of this invention. Undue experimentation would not be required as this information is generally known, and readily available.

Example embodiments deal largely with the assignment of frequency intervals. However, relative energy levels at different frequencies and changes of energy levels and/or frequencies over time can also be used to impart meaning to audible alerts. The same applies for other sound qualities including but not limited to timbre, comprising overtones (harmonics and partials), attack, decay, sustain, release; tremolo; and vibrato. These and other factors would be taken into account by those practicing embodiments of this invention. Again, undue experimentation would not be required as this information is generally known, and readily available. Lastly, the acoustic symbols comprising a set of acoustic symbols, and the sounds comprising an acoustic symbol need not all share the same basic sound characteristics. For example, some sounds might be sine waves while other sounds may be similar to conventional phone rings.

A skilled technologist will realize that there are many ways to construct, store, and manipulate audible alerts of certain embodiments. An example in which preference settings 210 (FIG. 2A) call for the conversion of words into strings of symbols representing phonemes follows. On first receiving a communication from a new initiator, the receiver's device accesses the signaling portion of the communication and determines an identifier, such as the ANI of a telephone call, or the header of an email. In some embodiments, the initiator's (subscriber) name is also part of the signaling portion of the communication. In an Internet embodiment, the name may not be necessarily available from the communication, but could be accessed via a data structure (e.g., database, array, look-up table, etc.). From that information, the phonemes of the name or other type of identifier are accessed from another data structure. Then, the acoustic symbols that correspond to the phonemes are assigned and are stored in a final data structure. Alternatively, the sound preference (including timbre, tremolo, vibrato, for example) selected from section 318 (FIG. 3) is applied to the acoustic symbols and that data is stored in an alternative final data structure. Example data structures for storing the final data in a memory are arrays, linked lists, tables, files, databases and so forth. Likewise, data corresponding to the receiver would be stored in a similar final data structure for the receiver, or could be combined with the data for the initiators. The data structures for storing the conversion of ANI, IP address, e-mail address or other identifier to name (or other identifier), name or number to phonemes, and so forth can be of various types also. If the name is not part of the signaling portion of the communication, it may be derived from an electronic address book or contacts database. For subsequent communications from the same initiator, the final data structure is indexed based on the identifier from the signaling portion of the communication to access the acoustic symbols or alert sound or sounds corresponding to the initiator or to access the sound preference applied to the acoustic symbols corresponding to the initiator. Similarly, data corresponding to the receiver is accessed from the appropriate data structure if the receiver information is selected in section 303 (FIG. 3). The appropriate data stored in the data structures is modified upon changes to preference settings. Alternatively, some or all aspects of the transformation from an identifier to an audible alert could be performed each time a communication is received.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its essential characteristics. The described embodiment is to be considered in all respects only as illustrative and not restrictive.

What is claimed is:

1. A method of generating at least two distinctive auditory alerts upon receiving a telephone call at a device, the method comprising:
    accessing data indicative of a first plurality of sounds corresponding to a user of a device, wherein the data corresponds to a sequence of phonemes associated with the user, the device configured to receive a telephone call;
    playing the first plurality of sounds at the device so as to identify a received telephone call being directed to the user, wherein the plurality of sounds are based on the sequence of phonemes, and wherein the sounds do not constitute words of a spoken language;
    accessing a telephone number or a subscriber name associated with a calling party of the telephone call;
    retrieving data indicative of a second plurality of sounds designating the calling party based on the telephone number or subscriber name; and
    playing the second plurality of sounds at the device so as to identify the calling party.

2. The method of claim 1, prior to the accessing, additionally comprising assigning data indicative of the first plurality of sounds corresponding to the user of the device.

3. The method of claim 1, wherein retrieving comprises applying a transformation based on the telephone number or subscriber name.

4. The method of claim 3, wherein the transformation comprises rules assigning phonic symbols based on the subscriber name.

5. The method of claim 4, wherein the assigned phonic symbols correspond to phonemes of the subscriber name.

6. The method of claim 1 wherein each sound lacks spectral and temporal complexity and variability of natural phonemes.

7. The method of claim 1, wherein playing the first plurality of sounds comprises playing a portion of the first plurality of sounds concurrently.

8. The method of claim 1, wherein playing the second plurality of sounds comprises playing a portion of the second plurality of sounds concurrently.

9. The method of claim 1, wherein playing the first plurality of sounds is repeated, after a time interval, for a first predetermined number of times.

10. The method of claim 1, wherein playing the second plurality of sounds is repeated, after a time interval, for a second predetermined number of times.

11. The method of claim 1, wherein playing the first plurality of sounds is followed by a predetermined period of silence and playing the second plurality of sounds, and wherein the first plurality of sounds, the predetermined period of silence and the second plurality of sounds is repeated, after a time interval, for a predetermined number of times.

12. The method of claim 1, wherein playing the second plurality of sounds is followed by a predetermined period of silence and playing the first plurality of sounds, and wherein the first plurality of sounds, the predetermined period of silence and the second plurality of sounds is repeated, after a time interval, for a predetermined number of times.

13. The method of claim 1, wherein the number of sounds in the first and second plurality of sounds is selected from a group of less than seven unique sounds.

14. The method of claim 13, wherein the sounds in the first and second plurality of sounds are played individually or in combinations, having up to 63 combinations or composite sounds.

15. The method of claim 1, wherein the number of sounds in the first and second plurality of sounds is selected from a group of less than ten unique sounds.

16. The method of claim 1, wherein the first or second plurality of sounds is either six or nine sounds.

17. The method of claim 1, wherein the sounds in the first plurality of sounds correspond to a first set of selected notes.

18. The method of claim 1, wherein the sounds in the second plurality of sounds correspond to a second set of selected notes.

19. The method of claim 1, wherein the sounds in the first plurality of sounds and the second plurality of sounds correspond to a predetermined set of notes or chords.

20. The method of claim 1, wherein the sounds in the first plurality of sounds and the second plurality of sounds correspond to a set of outputs from a speech engine.

21. The method of claim 1, wherein the device comprises a mobile telephone, a wireless telephone, a pager, or a two-way radio.

22. The method of claim 1, wherein the device comprises a computing device with a telephone call capability.

23. The method of claim 1, wherein accessing the telephone number comprises automatically retrieving the telephone number associated with the calling party of the telephone call at the device.

24. The method of claim 1, wherein the telephone number comprises a caller number identification (CNID).

25. The method of claim 1, wherein the telephone number comprises an automatic number identification (ANI).

26. The method of claim 1, wherein the telephone number comprises a calling party's number (CPN).

27. The method of claim 1, wherein retrieving comprises indexing a data structure based on the telephone number or subscriber name.

28. The method of claim 27, wherein the data structure is a list, array or table.

29. The method of claim 27, wherein the data structure is a database.

30. The method of claim 3, wherein the transformation comprises rules for arranging and/or parsing the telephone number.

31. The method of claim 30, additionally comprising assigning phonic symbols to the arranged and/or parsed telephone number.

32. The method of claim 1, additionally comprising assigning default sounds for the second plurality of sounds.

33. The method of claim 1, additionally comprising assigning default sounds for the first and second plurality of sounds.

34. The method of claim 27, additionally comprising automatically assigning a particular second plurality of sounds to the telephone number of the calling party.

35. The method of claim 1 additionally comprising automatically assigning a particular second plurality of sounds corresponding to the calling party.

36. The method of claim 34, additionally comprising storing the assigned particular second plurality of sounds and the corresponding telephone number of the calling party in the data structure.

37. The method of claim 1 additionally comprising assigning default sounds for the first plurality of sounds.

38. The method of claim 1, wherein the user selects the sounds of the first plurality of sounds.

39. The method of claim 1, wherein the user selects a type of sound via a user interface.

40. The method of claim 1, wherein the first plurality of sounds corresponds to one instrument and the second plurality of sounds corresponds to a second instrument.

41. The method of claim 1, wherein the first plurality of sounds and the second plurality of sounds corresponds to the same instrument.

42. The method of claim 1, wherein the first plurality of sounds corresponds to multiple instruments and the second plurality of sounds corresponds to one instrument.

43. The method of claim 1, wherein the first plurality of sounds corresponds to one instrument and the second plurality of sounds corresponds to multiple instruments.

44. The method of claim 1, additionally comprising selecting the first plurality of sounds corresponding to a user prior to accessing the data indicative of the first plurality of sounds.

45. The method of claim 44, wherein the selecting comprises randomly generating the first plurality of sounds.

46. The method of claim 44, wherein the selecting comprises receiving a user input.

47. The method of claim 46, wherein the selecting further comprises applying transformations based on the user input.

48. The method of claim 44, wherein the selecting comprises obtaining a user identifier based on a dialed number identification service (DNIS) corresponding to the telephone call.

49. The method of claim 48, wherein the selecting further comprises applying transformations based on the user identifier.

50. The method of claim 44, additionally comprising storing the selected first plurality of sounds in a memory.

51. A method of generating at least two distinctive auditory alerts upon receiving a telephone call at a device, the method comprising:
   playing a first plurality of sounds at a device so as to identify a received telephone call being directed to a user of the device;
   accessing a telephone number or subscriber name associated with a calling party of the telephone call;
   retrieving data indicative of a second plurality of sounds corresponding to the calling party based on the telephone number or subscriber name, wherein the plurality of sounds are based on a sequence of phonemes associated with the calling party, and wherein the sounds do not constitute words of a spoken language; and
   playing the second plurality of sounds at the device so as to identify the calling party.

52. The method, of claim 51, wherein retrieving comprises applying a transformation based on the telephone number or subscriber name.

53. The method of claim 52, wherein the transformation comprises rules for arranging and/or parsing the telephone number, or rules assigning phonic symbols based on the subscriber name.

54. The method of claim 53, additionally comprising assigning phonic symbols to the arranged and/or parsed telephone number, wherein the assigned phonic symbols correspond to phonemes of the arranged and/or parsed telephone number or the subscriber name.

55. The method of claim 51, wherein playing the first plurality of sounds is followed by a predetermined period of silence and playing the second plurality of sounds, and wherein the first plurality of sounds, the predetermined period of silence and the second plurality of sounds is repeated, after a time interval, for a predetermined number of times.

56. The method of claim 51, wherein playing the second plurality of sounds is followed by a predetermined period of silence and playing the first plurality of sounds, and wherein the first plurality of sounds, the predetermined period of silence and the second plurality of sounds is repeated, after a time interval, for a predetermined number of times.

57. The method of claim 51, wherein retrieving comprises indexing a data structure based on the telephone number or subscriber name.

58. The method of claim 57, wherein the data structure is a list, array, table, or database.

59. The method of claim 51, wherein the first plurality of sounds corresponds to one instrument and the second plurality of sounds corresponds to a second instrument.

60. The method of claim 51, wherein the first plurality of sounds corresponds to multiple instruments and the second plurality of sounds corresponds to one instrument, or the first plurality of sounds corresponds to one instrument and the second plurality of sounds corresponds to multiple instruments, or both the first and second plurality of sounds correspond to multiple instruments.

61. A method of generating at least two distinctive auditory alerts upon receiving a telephone call at a device, the method comprising:
   accessing data indicative of a first plurality of sounds corresponding to a user of a device, wherein the data corresponds to a sequence of phonemes associated with the user, the device configured to receive a telephone call;
   playing the first plurality of sounds at the device so as to identify a received telephone call being directed to the user, wherein the plurality of sounds are based on the sequence of phonemes, and wherein the sounds do not constitute words of a spoken language;
   accessing an identifier associated with a calling party of the telephone call;
   retrieving data indicative of a second plurality of sounds designating the calling party based on the identifier; and
   playing the second plurality of sounds at the device so as to identify the calling party.

62. The method of claim 61, wherein accessing the identifier comprises automatically retrieving the identifier associated with the calling party from a signaling portion of the telephone call.

63. The method of claim 61, wherein retrieving comprises indexing a data structure based on the identifier.

64. The method of claim 63, additionally comprising automatically assigning a particular second plurality of sounds to the identifier of the calling party.

65. The method of claim 64, wherein the particular second plurality of sounds is randomly generated.

66. The method of claim 64, additionally comprising storing the assigned particular second plurality of sounds and the corresponding identifier of the calling party in the data structure.

67. The method of claim 61, wherein retrieving comprises applying a transformation based on the identifier.

68. The method of claim 67, wherein the transformation comprises rules for arranging and/or parsing the identifier, or rules assigning phonic symbols based on the identifier.

69. The method of claim 67, wherein the transformation comprises rules for randomly arranging and/or parsing the identifier, or rules assigning random phonic symbols based on the identifier.

70. The method of claim 61, additionally comprising selecting the first plurality of sounds corresponding to a user prior to accessing the data indicative of the first plurality of sounds.

71. The method of claim 70, wherein the selecting comprises randomly generating the first plurality of sounds.

72. The method of claim 70, wherein the selecting comprises receiving a user input.

73. The method of claim 72, wherein the selecting further comprises applying transformations based on the user input.

74. The method of claim 70, additionally comprising storing the selected first plurality of sounds in a memory.

75. A method of generating at least two distinctive auditory alerts upon receiving a transmission at a communication device, the method comprising:
   accessing data indicative of a first plurality of sounds corresponding to a user of a communication device, wherein the data corresponds to a sequence of phonemes associated with the user, the communication device configured to receive a transmission;
   playing the first plurality of sounds at the communication device so as to identify a received transmission being directed to the user, wherein the plurality of sounds are based on the sequence of phonemes, and wherein the sounds do not constitute words of a spoken language;
   accessing an identifier associated with a transmitting party of the transmission;
   retrieving data indicative of a second plurality of sounds designating the transmitting party based on the identifier; and
   playing the second plurality of sounds at the device so as to identify the transmitting party.

76. The method of claim 75, wherein the transmission is an electronic mail.

77. The method of claim 75, wherein the transmission is a telephone call.

78. The method of claim 75, wherein the transmission is a short messaging service or a multi-media messaging service transmission.

79. The method of claim 75, wherein the transmission is a paging transmission.

80. The method of claim 75, wherein the transmission comprises text.

81. The method of claim 75, wherein the transmission comprises a picture.

82. The method of claim 75, wherein the transmission comprises a signaling portion including the identifier associated with the transmitting party of the transmission.

83. The method of claim 82, wherein the identifier comprises a name of the transmitting party.

84. The method of claim 82, wherein the identifier comprises a caller number identification, automatic number identification, or calling party's number of the transmitting party.

85. The method of claim 82, wherein the identifier comprises an Internet protocol address of the transmitting party.

86. The method of claim 82, wherein the identifier comprises an electronic-mail address of the transmitting party.

87. A method of generating a distinctive auditory alert upon receiving a telephone call at a device, the method comprising:
   accessing a telephone number or subscriber name associated with a calling party of a telephone call;
   retrieving data indicative of a plurality of sounds designating the calling party based on the telephone number or subscriber name, wherein the data corresponds to a sequence of phonemes associated with the calling party; and
   playing the plurality of sounds at the device so as to identify the calling party, wherein the plurality of sounds are based on the sequence of phonemes, and wherein the sounds do not constitute words of a spoken language.

88. The method of claim 87, wherein a user of the device does not select the sounds of the plurality of sounds.

89. The method of claim 87, wherein retrieving comprises indexing a data structure based on the telephone number or subscriber name.

90. The method of claim 89, wherein the data structure is a list, array, table, or database.

91. The method of claim 87, wherein retrieving comprises applying a transformation based on the telephone number or subscriber name.

92. The method of claim 91, wherein the transformation comprises rules for arranging and/or parsing the telephone number, or rules assigning phonic symbols based on the subscriber name.

93. The method of claim 92, additionally comprising assigning phonic symbols to the arranged and/or parsed telephone number, wherein the assigned phonic symbols correspond to phonemes of the arranged and/or parsed telephone number or the subscriber name.

94. The method of claim 89, additionally comprising automatically assigning a particular plurality of sounds to the telephone number of the calling party.

95. The method of claim 87, additionally comprising automatically assigning a particular plurality of sounds corresponding to the calling party.

96. The method of claim 94, additionally comprising storing the assigned particular plurality of sounds and the corresponding telephone number of the calling party in the data structure.

97. The method of claim 87, wherein the plurality of sounds for each calling party is played in a sequence.

98. The method of claim 97, wherein two or more sounds overlap at one or more predetermined times in the sequence.

99. The method of claim 98, wherein the sequence of the plurality of sounds is unique for each calling party.

100. The method of claim 98, wherein the plurality of sounds corresponds to one instrument.

101. The method of claim 98, wherein the plurality of sounds corresponds to multiple instruments, and wherein the sounds of the multiple instruments overlap at times.

102. A method of generating a distinctive auditory alert upon receiving a telephone call at a device, the method comprising:
    accessing a telephone number or subscriber name associated with a calling party of a telephone call;
    automatically assigning a particular plurality of sounds to correspond to the telephone number or subscriber name of the calling party; and
    playing the plurality of sounds at the device so as to identify the calling party, wherein the plurality of sounds are based on a sequence of phonemes associated with the calling party, and wherein the sounds do not constitute words of a spoken language.

103. The method of claim 102, wherein a user of the device does not select the sounds of the plurality of sounds.

104. The method of claim 102, wherein automatically assigning comprises applying transformations based on the telephone number or subscriber name.

105. The method of claim 104, wherein the transformations comprise arranging and/or parsing the telephone number.

106. The method of claim 105, additionally comprising assigning phonic symbols to the arranged and/or parsed telephone number.

107. The method of claim 104, wherein the transformations comprise assigning phonic symbols based on the subscriber name.

108. The method of claim 107, wherein the assigned phonic symbols correspond to phonemes of the subscriber name.

109. The method of claim 102, additionally comprising assigning each calling party a unique plurality of sounds to be played in a sequence.

110. The method of claim 109, wherein two or more sounds overlap at one or more predetermined times in the sequence.

111. The method of claim 102, additionally comprising storing the assigned particular plurality of sounds and the corresponding telephone number or subscriber name of the calling party in a data structure associated with the device.

112. The method of claim 111, wherein the data structure is a list, array, table, or database.

113. The method of claim 111, in a subsequent telephone call to the device from a calling party that has previously called the device, additionally comprising:
    indexing the data structure based on the telephone number or subscriber name of the calling party to retrieve the assigned plurality of sounds designating the calling party; and
    playing the plurality of sounds in a sequence at the device so as to identify the calling party.

114. A method of generating a distinctive auditory alert upon receiving a transmission at a communication device, the method comprising:
    accessing an identifier associated with a transmitting party of a transmission;
    automatically assigning a particular plurality of sounds to correspond to the identifier of the transmitting party; and
    playing the plurality of sounds at the device so as to identify the transmitting party, wherein the plurality of sounds are based on a sequence of phonemes associated with the transmitting party, and wherein the sounds do not constitute words of a spoken language.

115. The method of claim 114, wherein the transmission comprises a signaling portion including the identifier associated with the transmitting party of the transmission.

116. The method of claim 115, wherein the identifier comprises a name of the transmitting party.

117. The method of claim 115, wherein the identifier comprises a caller number identification, automatic number identification, or calling party's number of the transmitting party.

118. The method of claim 115, wherein the identifier comprises an Internet protocol address of the transmitting party.

119. The method of claim 115, wherein the identifier comprises an electronic-mail address of the transmitting party.

120. A system for generating at least two distinctive auditory alerts upon receiving a telephone call, the system comprising:
    data indicative of a first plurality of sounds designating a user of a device, wherein the data corresponds to a sequence of phonemes associated with the user, the device configured to receive a telephone call;
    a sound generator at the device configured to play the first plurality of sounds in a sequence so as to identify a received telephone call being directed to the user, wherein the plurality of sounds are based on the sequence of phonemes and wherein the sounds do not constitute words of a spoken language;
    a telephone number module configured to access a telephone number or subscriber name associated with a calling party of the telephone call; and
    a calling party module configured to provide data indicative of a second plurality of sounds designating the calling party based on the accessed telephone number or subscriber name, wherein the sound generator is further configured to play the second plurality of sounds in a sequence so as to identify the calling party.

121. The system of claim 120, wherein the calling party module comprises a data structure indexed by the accessed telephone number or subscriber name.

122. The system of claim 120, wherein the telephone number module accesses a caller number identification (CNID), an automatic number identification (ANI), or a calling party's number (CPN).

123. The system of claim 121, wherein the data structure is a list, array, table, or database.

124. The system of claim 120, wherein the calling party module comprises a transformation process based on the accessed telephone number or subscriber name.

125. The system of claim 124, wherein the transformation process comprises rules for arranging and/or parsing the telephone number, or rules assigning phonic symbols based on the subscriber name.

126. The system of claim 120, wherein the first plurality of sounds corresponds to one instrument and the second plurality of sounds corresponds to a second instrument.

127. The system of claim 120, wherein the first plurality of sounds corresponds to multiple instruments and the second plurality of sounds corresponds to one instrument, or the first plurality of sounds corresponds to one instrument and the second plurality of sounds corresponds to multiple instruments.

128. The system of claim 120, wherein two or more sounds of the second plurality of sounds overlap at one or more predetermined times in the sequence.

129. A system for generating at least two distinctive auditory alerts upon receiving a telephone call, the system comprising:
a first plurality of sounds indicative of a user of a device, wherein the data corresponds to a sequence of phonemes associated with the user, the device configured to receive a telephone call; and
a second plurality of sounds indicative of a calling party of the received telephone call,
wherein the device is configured to
play the first plurality of sounds in a sequence so as to identify the received telephone call being directed to the user, wherein the plurality of sounds are based on the sequence of phonemes, and wherein the sounds do not constitute words of a spoken language,
access a telephone number or subscriber name associated with the calling party of the received telephone call, and
play the second plurality of sounds in a sequence so as to identify the calling party.

130. The system of claim 129, wherein the device comprises a data structure indexed by the accessed telephone number or subscriber name.

131. The system of claim 129, wherein the device comprises a module configured to apply transformations based on the accessed telephone number or subscriber name.

132. The system of claim 129, wherein the device comprises a memory configured to store the first plurality of sounds indicative of the user of the device.

133. A telephonic device comprising means for producing an acoustic representation of a message, the acoustic representation comprising acoustic symbols, the acoustic symbols representing phonemes of a language, wherein the acoustic symbols comprise combinations of sounds, single sounds, and/or silence, and wherein the acoustic symbols are produced in a temporal order consistent with the language, and additionally comprising means for assigning the combinations of sounds or the single sounds to the acoustic symbols, wherein the acoustic representation does not utilize words of a spoken human language.

134. The telephonic device defined in claim 133, additionally comprising an audible alert/ringer, wherein the alert/ringer is configured to generate an acoustic representation of a message.

135. The telephonic device defined in claim 134, wherein the message comprises information regarding an incoming call.

136. The telephonic device defined in claim 135, wherein the information comprises a caller ID of the incoming call.

137. The telephonic device defined in claim 134, wherein the message comprises the name of an owner of the telephonic device.

138. The telephonic device defined in claim 134, wherein the message comprises the name of the telephonic device.

139. The telephonic device defined in claim 133, wherein the means for assigning the combinations of sounds or the single sounds to the acoustic symbols comprises means for randomly assigning the combinations of sounds or the single sounds to the acoustic symbols.

140. The telephonic device defined in claim 133, wherein the means for assigning the combinations of sounds or the single sounds to the acoustic symbols further comprises means for a user to assign the combinations of sounds or the single sounds to the acoustic symbols.

141. The telephonic device defined in claim 133, additionally comprising a transmitter of the acoustic representation of a message and a receiver of the acoustic representation of a message.

142. The telephonic device defined in claim 133, wherein the telephonic device comprises a mobile telephone, a wireless telephone, a pager, or a two-way radio.

143. A method of generating a distinctive auditory alert upon receiving a telephone call at a device, the method comprising:
accessing data indicative of a plurality of sounds in a sequence corresponding to a user of a device, wherein the data corresponds to a sequence of phonemes associated with the user, the device configured to receive a telephone call; and
playing the plurality of sounds in the sequence at the device so as to identify a received telephone call being directed to the user, wherein the plurality of sounds are based on the sequence of phonemes, and wherein the sounds do not constitute words of a spoken language.

144. The method of claim 143, prior to the accessing, additionally comprising assigning data indicative of the plurality of sounds in the sequence corresponding to the user of the device.

145. The method of claim 143, wherein the plurality of sounds comprises combinations of notes.

146. The method of claim 145, wherein the combinations of notes at least partially overlap in time.

147. The method of claim 143, prior to the accessing, additionally comprising assigning data indicative of a plurality of sounds in the sequence corresponding to the user of the device, wherein the plurality of sounds in the sequence correspond to a phone number of the device.

148. The method of claim 143, prior to the accessing, additionally comprising assigning data indicative of a plurality of sounds in the sequence corresponding to the user of the device, wherein the plurality of sounds in the sequence correspond to a name of the user.

149. The method of claim 143, prior to the accessing, additionally comprising assigning data indicative of a plurality of sounds in the sequence corresponding to the user of the device, wherein the plurality of sounds in the sequence correspond to one or more words selected by the user.

150. The method of claim 143, wherein the plurality of sounds in the sequence corresponding to the user is unique to the user.

151. A method of generating a distinctive auditory alert upon receiving a transmission at a communication device, the method comprising:
   accessing data indicative of a plurality of sounds in a sequence corresponding to a user of a communication device, the communication device configured to receive a transmission, wherein the plurality of sounds comprises combinations of notes, and wherein the combinations of notes at least partially overlap in time, and wherein the data corresponds to a sequence of phonemes associated with the user; and
   playing the plurality of sounds in the sequence at the device so as to identify a received transmission being directed to the user, wherein the plurality of sounds are based on the sequence of phonemes, and wherein the sounds do not constitute words of a spoken language.

152. The method of claim 151, wherein the transmission is an electronic mail.

153. The method of claim 151, wherein the transmission is a telephone call.

154. The method of claim 151, wherein the transmission is a short messaging service or a multi-media messaging service transmission.

155. The method of claim 151, wherein the transmission is a paging transmission.

156. The method of claim 151, wherein the transmission comprises text.

157. The method of claim 151, wherein the transmission comprises a picture.

158. The method of claim 151, wherein the transmission comprises a signaling portion including an identification of an originator of the transmission.

159. The method of claim 158, wherein the identification comprises a name of the originator of the transmission.

160. The method of claim 158, wherein the identification comprises a caller number identification, automatic number identification, or calling party's number of the originator of the transmission.

161. The method of claim 158, wherein the identification comprises an Internet protocol address of the originator of the transmission.

162. The method of claim 158, wherein the identification comprises an electronic-mail address of the originator of the transmission.

163. The method of claim 151, wherein the communication device comprises a mobile telephone, a wireless telephone, a pager, or a two-way radio.

164. The method of claim 151, wherein the communication device comprises a personal computer, a portable computer, a hand-held computing device, or a wearable computing device.

* * * * *

UNITED STATES PATENT AND TRADEMARK OFFICE
CERTIFICATE OF CORRECTION

| | | |
|---|---|---|
| PATENT NO. | : 7,869,588 B2 | Page 1 of 1 |
| APPLICATION NO. | : 11/119229 | |
| DATED | : January 11, 2011 | |
| INVENTOR(S) | : Mark I. Fitchmun | |

It is certified that error appears in the above-identified patent and that said Letters Patent is hereby corrected as shown below:

On the Title Page Item (74) Attorney, Agent, or Firm, after "Knobbe Martens Olson & Bear" insert --LLP--

At Column 13, Line 62, after "specified" insert --.--

At Column 14, Line 7, change "later" to --latter--

At Column 23, Line 13, change "four" to --four four--

At Column 28, Line 50, In Claim 52, change "method," to --method--

At Column 32, Line 59, In Claim 120, change "phonemes" to --phonemes,--

Signed and Sealed this

Thirteenth Day of September, 2011

David J. Kappos
*Director of the United States Patent and Trademark Office*